US008271830B2

(12) United States Patent
Erofeev

(10) Patent No.: US 8,271,830 B2
(45) Date of Patent: *Sep. 18, 2012

(54) ROLLING CACHE CONFIGURATION FOR A DATA REPLICATION SYSTEM

(75) Inventor: Andrei Erofeev, Marlboro, NJ (US)

(73) Assignee: Commvault Systems, Inc., Oceanport, NJ (US)

( * ) Notice: Subject to any disclaimer, the term of this patent is extended or adjusted under 35 U.S.C. 154(b) by 262 days.

This patent is subject to a terminal disclaimer.

(21) Appl. No.: 12/642,491

(22) Filed: Dec. 18, 2009

(65) Prior Publication Data

US 2010/0100529 A1  Apr. 22, 2010

Related U.S. Application Data

(63) Continuation of application No. 11/640,831, filed on Dec. 18, 2006.

(60) Provisional application No. 60/833,851, filed on Jul. 27, 2006, provisional application No. 60/752,204, filed on Dec. 19, 2005.

(51) Int. Cl.
*G06F 11/00* (2006.01)
*G06F 11/16* (2006.01)

(52) U.S. Cl. ........... 714/6.23; 714/6.2; 714/6.3; 714/12; 714/13; 710/53; 710/54

(58) Field of Classification Search .................. 714/6.2, 714/6.23, 6.31, 6.32, 12, 18; 710/53, 54, 710/56

See application file for complete search history.

(56) References Cited

U.S. PATENT DOCUMENTS

| 4,296,465 A | 10/1981 | Lemak |
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |

(Continued)

FOREIGN PATENT DOCUMENTS

AU  2006331932  12/2006

(Continued)

OTHER PUBLICATIONS

Armstead et al., "Implementation of a Campus-wide Distributed Mass Storage Service: The Dream vs. Reality," IEEE, 1995, pp. 190-199.

(Continued)

*Primary Examiner* — Joseph Schell

(74) *Attorney, Agent, or Firm* — Knobbe Martens Olson & Bear LLP

(57) ABSTRACT

Performing data management operations on replicated data in a computer network. Log entries are generated for data management operations of an application executing on a source system. Consistency point entries are used to indicate a time of a known good, or recoverable, state of the application. A destination system is configured to process a copy of the log and consistency point entries to replicate data in a replication volume, the replicated data being a copy of the application data on the source system. When the replicated data represents a known good state of the application, as determined by the consistency point entries, the destination system(s) may perform a storage operation (e.g., snapshot, backup) to copy the replicated data and to logically associate the copied data with a time information (e.g., time stamp) indicative of the source system time when the application was in the known good state.

17 Claims, 15 Drawing Sheets

U.S. PATENT DOCUMENTS

| | | | |
|---|---|---|---|
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,263,154 A | 11/1993 | Eastridge et al. | |
| 5,265,159 A | 11/1993 | Kung | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,351 A | 4/1994 | Jippo | |
| 5,311,509 A | 5/1994 | Heddes et al. | |
| 5,317,731 A | 5/1994 | Dias et al. | |
| 5,321,816 A | 6/1994 | Rogan et al. | |
| 5,333,315 A | 7/1994 | Saether et al. | |
| 5,347,653 A | 9/1994 | Flynn et al. | |
| 5,369,757 A | 11/1994 | Spiro et al. | |
| 5,403,639 A | 4/1995 | Belsan et al. | |
| 5,410,700 A | 4/1995 | Fecteau et al. | |
| 5,448,724 A | 9/1995 | Hayashi et al. | |
| 5,455,926 A | 10/1995 | Keele et al. | |
| 5,487,072 A * | 1/1996 | Kant | 714/748 |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,546,536 A * | 8/1996 | Davis et al. | 714/20 |
| 5,555,404 A | 9/1996 | Torbjornsen et al. | |
| 5,559,957 A | 9/1996 | Balk | |
| 5,559,991 A | 9/1996 | Kanfi | |
| 5,598,546 A | 1/1997 | Blomgren | |
| 5,604,862 A | 2/1997 | Midgely et al. | |
| 5,615,392 A | 3/1997 | Harrison et al. | |
| 5,619,644 A | 4/1997 | Crockett et al. | |
| 5,638,509 A | 6/1997 | Dunphy et al. | |
| 5,642,496 A | 6/1997 | Kanfi | |
| 5,673,381 A | 9/1997 | Huai et al. | |
| 5,675,511 A | 10/1997 | Prasad et al. | |
| 5,677,900 A | 10/1997 | Nishida et al. | |
| 5,682,513 A | 10/1997 | Candelaria et al. | |
| 5,687,343 A | 11/1997 | Fecteau et al. | |
| 5,689,706 A | 11/1997 | Rao et al. | |
| 5,699,361 A | 12/1997 | Ding et al. | |
| 5,719,786 A | 2/1998 | Nelson et al. | |
| 5,720,026 A | 2/1998 | Uemura et al. | |
| 5,729,743 A | 3/1998 | Squibb | |
| 5,737,747 A | 4/1998 | Vishlitzky et al. | |
| 5,742,792 A | 4/1998 | Yanai et al. | |
| 5,751,997 A | 5/1998 | Kullick et al. | |
| 5,758,359 A | 5/1998 | Saxon | |
| 5,761,677 A | 6/1998 | Senator et al. | |
| 5,761,734 A | 6/1998 | Pfeffer et al. | |
| 5,764,972 A | 6/1998 | Crouse et al. | |
| 5,765,173 A | 6/1998 | Cane et al. | |
| 5,778,395 A | 7/1998 | Whiting et al. | |
| 5,790,114 A | 8/1998 | Geaghan et al. | |
| 5,790,828 A | 8/1998 | Jost | |
| 5,805,920 A | 9/1998 | Sprenkle et al. | |
| 5,812,398 A | 9/1998 | Nielsen | |
| 5,813,009 A | 9/1998 | Johnson et al. | |
| 5,813,017 A | 9/1998 | Morris | |
| 5,829,046 A | 10/1998 | Tzelnic et al. | |
| 5,860,104 A | 1/1999 | Witt et al. | |
| 5,875,478 A | 2/1999 | Blumenau | |
| 5,875,481 A | 2/1999 | Ashton et al. | |
| 5,878,408 A | 3/1999 | Van Huben et al. | |
| 5,887,134 A | 3/1999 | Ebrahim | |
| 5,901,327 A | 5/1999 | Ofek | |
| 5,907,621 A | 5/1999 | Bachman et al. | |
| 5,907,672 A | 5/1999 | Matze et al. | |
| 5,924,102 A | 7/1999 | Perks | |
| 5,926,836 A | 7/1999 | Blumenau | |
| 5,933,104 A | 8/1999 | Kimura | |
| 5,933,601 A | 8/1999 | Fanshier et al. | |
| 5,950,205 A | 9/1999 | Aviani, Jr. | |
| 5,956,519 A | 9/1999 | Wise et al. | |
| 5,958,005 A | 9/1999 | Thorne et al. | |
| 5,970,233 A | 10/1999 | Lie et al. | |
| 5,970,255 A | 10/1999 | Tran et al. | |
| 5,974,563 A | 10/1999 | Beeler, Jr. | |
| 5,987,478 A | 11/1999 | See et al. | |
| 5,991,779 A | 11/1999 | Bejar | |
| 5,995,091 A | 11/1999 | Near et al. | |
| 6,003,089 A | 12/1999 | Shaffer et al. | |
| 6,009,274 A | 12/1999 | Fletcher et al. | |
| 6,012,090 A | 1/2000 | Chung et al. | |
| 6,021,415 A | 2/2000 | Cannon et al. | |
| 6,021,475 A | 2/2000 | Nguyen et al. | |
| 6,023,710 A | 2/2000 | Steiner et al. | |
| 6,026,414 A | 2/2000 | Anglin | |
| 6,049,889 A * | 4/2000 | Steely et al. | 714/4.5 |
| 6,052,735 A | 4/2000 | Ulrich et al. | |
| 6,061,692 A | 5/2000 | Thomas et al. | |
| 6,072,490 A | 6/2000 | Bates et al. | |
| 6,076,148 A | 6/2000 | Kedem et al. | |
| 6,094,416 A | 7/2000 | Ying | |
| 6,094,684 A | 7/2000 | Pallmann | |
| 6,112,239 A | 8/2000 | Kenner et al. | |
| 6,122,668 A | 9/2000 | Teng et al. | |
| 6,131,095 A | 10/2000 | Low et al. | |
| 6,131,148 A | 10/2000 | West et al. | |
| 6,131,190 A | 10/2000 | Sidwell | |
| 6,137,864 A | 10/2000 | Yaker | |
| 6,148,377 A | 11/2000 | Carter et al. | |
| 6,148,412 A | 11/2000 | Cannon et al. | |
| 6,154,787 A | 11/2000 | Urevig et al. | |
| 6,154,852 A | 11/2000 | Amundson et al. | |
| 6,158,044 A | 12/2000 | Tibbetts | |
| 6,161,111 A | 12/2000 | Mutalik et al. | |
| 6,163,856 A | 12/2000 | Dion et al. | |
| 6,167,402 A | 12/2000 | Yeager | |
| 6,175,829 B1 | 1/2001 | Li et al. | |
| 6,195,695 B1 | 2/2001 | Cheston et al. | |
| 6,205,450 B1 | 3/2001 | Kanome et al. | |
| 6,212,512 B1 | 4/2001 | Barney et al. | |
| 6,212,521 B1 | 4/2001 | Minami et al. | |
| 6,230,164 B1 | 5/2001 | Rikieta et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,279,078 B1 * | 8/2001 | Sicola et al. | 711/119 |
| 6,292,783 B1 | 9/2001 | Rohler | |
| 6,301,592 B1 | 10/2001 | Aoyama et al. | |
| 6,304,880 B1 | 10/2001 | Kishi | |
| 6,311,193 B1 | 10/2001 | Sekido et al. | |
| 6,324,581 B1 | 11/2001 | Xu et al. | |
| 6,328,766 B1 | 12/2001 | Long | |
| 6,330,570 B1 | 12/2001 | Crighton et al. | |
| 6,330,642 B1 | 12/2001 | Carteau | |
| 6,343,324 B1 | 1/2002 | Hubis et al. | |
| 6,350,199 B1 | 2/2002 | Williams et al. | |
| RE37,601 E | 3/2002 | Eastridge et al. | |
| 6,353,878 B1 | 3/2002 | Dunham | |
| 6,356,801 B1 | 3/2002 | Goodman et al. | |
| 6,363,464 B1 | 3/2002 | Mangione | |
| 6,366,986 B1 | 4/2002 | St. Pierre et al. | |
| 6,366,988 B1 | 4/2002 | Skiba et al. | |
| 6,374,336 B1 | 4/2002 | Peters et al. | |
| 6,374,363 B1 | 4/2002 | Wu et al. | |
| 6,389,432 B1 | 5/2002 | Pothapragada et al. | |
| 6,397,308 B1 | 5/2002 | Ofek et al. | |
| 6,418,478 B1 | 7/2002 | Ignatius et al. | |
| 6,421,711 B1 | 7/2002 | Blumenau et al. | |
| 6,434,681 B1 | 8/2002 | Amangau | |
| 6,473,775 B1 | 10/2002 | Kusters et al. | |
| 6,487,561 B1 | 11/2002 | Ofek et al. | |
| 6,487,644 B1 | 11/2002 | Huebsch et al. | |
| 6,487,645 B1 | 11/2002 | Clark et al. | |
| 6,502,205 B1 * | 12/2002 | Yanai et al. | 714/6.32 |
| 6,519,679 B2 | 2/2003 | Devireddy et al. | |
| 6,538,669 B1 | 3/2003 | Lagueux, Jr. et al. | |
| 6,539,462 B1 | 3/2003 | Mikkelsen et al. | |
| 6,542,909 B1 | 4/2003 | Tamer et al. | |
| 6,542,972 B2 | 4/2003 | Ignatius et al. | |

| Patent No. | Date | Inventor |
|---|---|---|
| 6,564,228 B1 | 5/2003 | O'Connor |
| 6,581,143 B2 | 6/2003 | Gagne et al. |
| 6,604,118 B2 | 8/2003 | Kleinman et al. |
| 6,604,149 B1 | 8/2003 | Deo et al. |
| 6,615,223 B1 | 9/2003 | Shih et al. |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B1 | 11/2003 | Clapp et al. |
| 6,658,436 B2 | 12/2003 | Oshinsy et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,518 B2 | 9/2004 | Armangau et al. |
| 6,799,258 B1 | 9/2004 | Linde |
| 6,836,779 B2 | 12/2004 | Poulin |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 | 6/2005 | Kaiser |
| 6,925,512 B2 * | 8/2005 | Louzoun et al. ............... 710/100 |
| 6,938,135 B1 | 8/2005 | Kekre et al. |
| 6,938,180 B1 | 8/2005 | Dysert et al. |
| 6,941,393 B2 * | 9/2005 | Secatch ............... 710/52 |
| 6,944,796 B2 * | 9/2005 | Joshi et al. ............... 714/43 |
| 6,952,705 B2 | 10/2005 | Knoblock et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,181,477 B2 | 2/2007 | Saika et al. |
| 7,188,292 B2 * | 3/2007 | Cordina et al. ............... 714/748 |
| 7,191,198 B2 | 3/2007 | Asano et al. |
| 7,194,454 B2 | 3/2007 | Hansen et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil et al. |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Amangau et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 * | 5/2008 | Safford ............... 714/11 |
| 7,373,364 B1 | 5/2008 | Chapman |
| 7,380,072 B2 | 5/2008 | Kottomtharayil et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,409,509 B2 | 8/2008 | Devassy et al. |
| 7,415,488 B1 * | 8/2008 | Muth et al. ............... 707/648 |
| 7,430,587 B2 | 9/2008 | Malone et al. |
| 7,433,301 B2 | 10/2008 | Akahane et al. |
| 7,440,982 B2 | 10/2008 | Lu et al. |
| 7,467,167 B2 | 12/2008 | Patterson |
| 7,467,267 B1 | 12/2008 | Mayock |
| 7,472,238 B1 | 12/2008 | Gokhale |
| 7,475,284 B2 * | 1/2009 | Koike ............... 714/12 |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,529,748 B2 | 5/2009 | Wen et al. |
| 7,529,782 B2 | 5/2009 | Prahlad et al. |
| 7,532,340 B2 | 5/2009 | Koppich et al. |
| 7,536,291 B1 | 5/2009 | Retnamma et al. |
| 7,539,707 B2 | 5/2009 | Prahlad et al. |
| 7,539,835 B2 | 5/2009 | Kaiser |
| 7,543,125 B2 | 6/2009 | Gokhale |
| 7,546,324 B2 | 6/2009 | Prahlad et al. |
| 7,565,572 B2 | 7/2009 | Yamasaki |
| 7,596,586 B2 | 9/2009 | Gokhale et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,668,798 B2 | 2/2010 | Scanlon et al. |
| 7,669,029 B1 | 2/2010 | Mishra et al. |
| 7,689,467 B1 | 3/2010 | Belanger et al. |
| 7,702,533 B2 | 4/2010 | Barnard et al. |
| 7,716,171 B2 | 5/2010 | Kryger |
| 7,734,715 B2 | 6/2010 | Hyakutake et al. |
| 7,739,235 B2 | 6/2010 | Rousseau et al. |
| 7,810,067 B2 | 10/2010 | Kaelicke et al. |
| 7,840,533 B2 | 11/2010 | Prahlad et al. |

| | | |
|---|---|---|
| 7,870,355 B2 | 1/2011 | Erofeev |
| 7,930,476 B1 | 4/2011 | Castelli et al. |
| 7,962,455 B2 | 6/2011 | Erofeev |
| 7,962,709 B2 | 6/2011 | Agrawal |
| 8,024,294 B2 | 9/2011 | Kottomtharayil |
| 8,121,983 B2 | 2/2012 | Prahlad et al. |
| 2001/0029517 A1 | 10/2001 | De Meno et al. |
| 2001/0032172 A1 | 10/2001 | Moulinet et al. |
| 2001/0035866 A1 | 11/2001 | Finger et al. |
| 2001/0042222 A1* | 11/2001 | Kedem et al. .................... 714/6 |
| 2001/0044807 A1 | 11/2001 | Kleiman et al. |
| 2002/0004883 A1 | 1/2002 | Nguyen et al. |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0062230 A1 | 5/2002 | Morag et al. |
| 2002/0069324 A1 | 6/2002 | Gerasimov et al. |
| 2002/0083055 A1 | 6/2002 | Pachet |
| 2002/0103848 A1 | 8/2002 | Giacomini et al. |
| 2002/0107877 A1 | 8/2002 | Whiting et al. |
| 2002/0133511 A1 | 9/2002 | Hostetter et al. |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2003/0018657 A1 | 1/2003 | Monday |
| 2003/0028736 A1 | 2/2003 | Berkowitz et al. |
| 2003/0033308 A1 | 2/2003 | Patel et al. |
| 2003/0061491 A1 | 3/2003 | Jaskiewicz et al. |
| 2003/0097296 A1 | 5/2003 | Putt |
| 2003/0131278 A1 | 7/2003 | Fujibayashi |
| 2003/0135783 A1 | 7/2003 | Martin et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0098425 A1 | 5/2004 | Wiss et al. |
| 2004/0107199 A1 | 6/2004 | Dairymple et al. |
| 2004/0117572 A1 | 6/2004 | Welsh et al. |
| 2004/0139128 A1 | 7/2004 | Becker et al. |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267835 A1 | 12/2004 | Zwilling et al. |
| 2004/0267836 A1 | 12/2004 | Amangau et al. |
| 2005/0027892 A1 | 2/2005 | McCabe et al. |
| 2005/0033800 A1 | 2/2005 | Kavuri et al. |
| 2005/0080928 A1 | 4/2005 | Beverly et al. |
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0131900 A1 | 6/2005 | Palliyll et al. |
| 2005/0144202 A1 | 6/2005 | Chen |
| 2005/0187982 A1 | 8/2005 | Sato |
| 2005/0187992 A1 | 8/2005 | Prahlad et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0246376 A1 | 11/2005 | Lu et al. |
| 2005/0246510 A1 | 11/2005 | Retnamma et al. |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0020616 A1 | 1/2006 | Hardy et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0230244 A1 | 10/2006 | Amarendran et al. |
| 2006/0242371 A1 | 10/2006 | Shono et al. |
| 2006/0242489 A1 | 10/2006 | Brockway et al. |
| 2007/0043956 A1 | 2/2007 | El Far et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0143371 A1 | 6/2007 | Kottomtharayil |
| 2007/0143756 A1 | 6/2007 | Gokhale |
| 2007/0179990 A1 | 8/2007 | Zimran et al. |
| 2007/0183224 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahlad et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0226438 A1 | 9/2007 | Erofeev |
| 2007/0244571 A1 | 10/2007 | Wilson et al. |
| 2007/0288536 A1 | 12/2007 | Sen et al. |
| 2008/0016126 A1 | 1/2008 | Kottomtharayil et al. |
| 2008/0016293 A1 | 1/2008 | Saika |
| 2008/0059515 A1 | 3/2008 | Fulton |
| 2008/0103916 A1 | 5/2008 | Camarador et al. |
| 2008/0104357 A1 | 5/2008 | Kim et al. |
| 2008/0183775 A1 | 7/2008 | Prahlad et al. |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0306954 A1 | 12/2008 | Hornqvist |
| 2009/0044046 A1 | 2/2009 | Yamasaki |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0319534 A1 | 12/2009 | Gokhale |
| 2009/0319585 A1 | 12/2009 | Gokhale |
| 2010/0005259 A1 | 1/2010 | Prahlad |
| 2010/0049753 A1 | 2/2010 | Prahlad et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0131467 A1 | 5/2010 | Prahlad et al. |
| 2010/0145909 A1 | 6/2010 | Ngo |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2011/0238621 A1 | 9/2011 | Agrawal |
| 2011/0246416 A1 | 10/2011 | Prahlad et al. |

FOREIGN PATENT DOCUMENTS

| | | |
|---|---|---|
| CA | 2632935 | 12/2006 |
| EP | 0259912 | 3/1988 |
| EP | 0405926 | 1/1991 |
| EP | 0 467 546 | 1/1992 |
| EP | 0 774 715 | 5/1997 |
| EP | 0809184 | 11/1997 |
| EP | 0862304 | 9/1998 |
| EP | 0 899 662 | 3/1999 |
| EP | 0 981 090 | 2/2000 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |

| | | |
|---|---|---|
| JP | 11259348 | 9/1999 |
| JP | 200347811 | 12/2000 |
| WO | WO 93/03549 | 2/1993 |
| WO | WO 9303549 | 2/1993 |
| WO | WO 95/13580 | 5/1995 |
| WO | WO 98/39707 | 9/1998 |
| WO | WO 99/14692 | 3/1999 |
| WO | WO 99/12098 | 11/1999 |
| WO | WO 02/095632 A | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |
| WO | WO 2010/068570 | 6/2010 |

OTHER PUBLICATIONS

Ashton, et al., "Two Decades of policy-based storage management for the IBM mainframe computer", www.research.ibm.com, 19 pages, published Apr. 10, 2003, printed Jan. 3, 2009—cited in U.S. Appl. No. 12/276,868., www.research.ibm.com, Apr. 10, 2003, pp. 19.

http://en.wikipedia.org/wiki/Naive_Bayes_classifier.

International Search Report and Written Opinion; dated Mar. 25, 2010; International Application No. PCT/US2009/066880; 10 pages.

Jander, "Launching Storage-Area Net," Data Communications, US, McGraw Hill, NY, vol. 27, No. 4(Mar. 21, 1998), pp. 64-72.

Microsoft Corporation, "Microsoft Exchange Server: Best Practices for Exchange Database Management," 1998.

PCT International Search Report and Written Opinion for International Application No. PCT/US07/81681, Mail Date Nov. 13, 2009, 8 pages.

U.S. Appl. No. 11/640/831, Erofeev.

Arneson, David A., Control Data Corporation, Development of Omniserver; Mass Storage Systems, 1990, pp. 88-93.

Eitel, "Backup and Storage Management in Distributed Heterogeneous Environments," IEEE, 1994, pp. 124-126.

European Examination Report; Application No. 06848901.2, Apr. 1, 2009, pp. 7.

Gray, Jim, Reuter, Andreas: "Transaction Processing: Concepts and Techniques" 1994, Morgan Kaufmann Publisher, USA; pp. 646-655.

International Search Report from International Application No. PCT/US2006/048273, dated May 15, 2007.

Jason Gait, "The Optical File Cabinet: A Random-Access File system for Write-Once Optical Disks," IEEE Computer, vol. 21, No. 6, pp. 11-22 (1988) (see in particular figure 5 in p. 15 and the recitation in claim 5).

Luis-Felipe Cabrera et al.; ADSM: A Multi-Platform, Scalable, Backup and Archive Mass Storage System; Mar. 5, 1995; pp. 420-427, IBM Research Division.

Lyon J., Design considerations in replicated database systems for disaster protection, COMPCON 1988, Feb. 29, 1988, pp. 428-430.

Rosenblum et al., "The Design and Implementation of a Log-Structure File System," Operating Systems Review SIGOPS, vol. 25, No. 5, New York, US, pp. 1-15 (May 1991).

The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.

Wiesmann M, Database replication techniques: a three parameter classification, Oct. 16, 2000, pp. 206-215.

U.S. Appl. No. 12/433,238, filed Apr. 30, 2009, Prahlad et al.

Examiner's Report for Australian Application No. 2003279847, Dated Dec. 9, 2008, 4 pages.

Final Office Action for Japanese Application No. 2003531581, Mail Date Mar. 24, 2009, 6 pages.

First Office Action for Japanese Application No. 2003531581, Mail Date Jul. 8, 2008, 8 pages.

Veritas Software Corporation, "Veritas Volume Manager 3.2, Administrator's Guide," Aug. 2001, 360 pages.

Arneson, "Mass Storage Archiving in Network Environments" IEEE, 1998, pp. 45-50.

Canadian Office Action dated Dec. 29, 2010, Application No. CA2546304.

European Examination Report; Application No. 06848901.2, Apr. 1, 2009, pp. 7.

Gray (#2 of 2, pp. 604-609), Jim; Reuter Andreas, Transaction Processing Concepts and Techniques, Morgan Kaufmann Publisher, USA 1994, pp. 604-609.

International Search Report, PCT/US2004/038324, dated Dec. 28, 2009.

International Search Report, PCT/US2004/038455 dated Jan. 11, 2006.

Second Examination Report in EU Appl. No. 06 848 901.2-2201 dated Dec. 3, 2010.

Examiner's First Report; Application No. 2006331932 May 11, 2011 in 2 pages.

International Preliminary Report on Patentability, PCT Application No. PCT/US2009/066880, mailed Jun. 23, 2011, in 9 pages.

International Search Report and Written Opinion issued in PCT Application No. PCT/US2011/030396, mailed Jul. 18, 2011, in 20 pages.

International Search Report and Written Opinion issued in PCT Application No. PCT/US2011/38436, mailed Sep. 21, 2011, in 18 pages.

http://en.wikipedia.org/wiki/Naive_Bayes_classifier, printed on Jun. 1, 2010, in 7 pages.

Harrington, Lisa H., "The RFP Process: How to Hire a Third Party", Transportation & Distribution, Sep. 1988, vol. 39, Issue 9, in 5 pages.

International Search Report dated May 15, 2007, PCT/US2006/048273.

Kashyap, et al., "Professional Services Automation: A knowledge Management approach using LSI and Domain specific Ontologies", FLAIRS-01 Proceedings, 2001, pp. 300-302.

* cited by examiner

| DIRECTORY INODE | SHORT NAME | ENTRY INODE |
|---|---|---|
| 1 | / | 1 |
| 1 | dir | 2 |
| 2 | file | 3 |
| 2 | user | 4 |

*FIGURE 12*

ROLLING CACHE CONFIGURATION FOR A DATA REPLICATION SYSTEM

RELATED APPLICATIONS

The present application is a continuation application of U.S. patent application Ser. No. 11/640,831, filed on Dec. 18, 2006, and entitled "ROLLING CACHE CONFIGURATION FOR A DATA REPLICATION SYSTEM," which claims the benefit of priority under 35 U.S.C. §119(e) from U.S. Provisional Application No. 60/833,851, filed Jul. 27, 2006, and entitled "SYSTEMS AND METHODS FOR CONTINUOUS DATA REPLICATION," and U.S. Provisional Application No. 60/752,204, filed Dec. 19, 2005, and entitled "SYSTEM AND METHOD FOR ESTABLISHING REFERENTIAL CONSISTENCY IN STORAGE OPERATIONS," the entirety of each of which is hereby incorporated herein by reference.

The present application is also related to the following applications filed on even date herewith, each of which is hereby incorporated herein by reference in its entirety:

U.S. patent application Ser. No. 11/640,826, entitled "SYSTEMS AND METHODS FOR PERFORMING DATA REPLICATION";

U.S. patent application Ser. No. 11/640,825, entitled "BUFFER CONFIGURATION FOR A DATA REPLICATION SYSTEM";

U.S. patent application Ser. No. 11/640,830, entitled "PATHNAME TRANSLATION IN A DATA REPLICATION SYSTEM";

U.S. patent application Ser. No. 11/640,829, entitled "SYSTEMS AND METHODS FOR MONITORING APPLICATION DATA IN A DATA REPLICATION SYSTEM";

U.S. patent application Ser. No. 11/640,824, entitled "DESTINATION SYSTEMS AND METHODS FOR PERFORMING DATA REPLICATION"; and U.S. patent application Ser. No. 11/640,835, entitled "NETWORK REDIRECTOR SYSTEMS AND METHODS FOR PERFORMING DATA REPLICATION".

BACKGROUND OF THE INVENTION

1. Field of the Invention

The present disclosure relates to performing copy and/or data management operations in a computer network and, in particular, to systems and methods for performing data replication in a storage management system.

2. Description of the Related Art

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

Many approaches to protecting data involve creating a copy of the data, such as backing up and/or replicating data on one or more storage devices. When creating a copy of such data, certain factors are generally considered. First, a copy of data should not contain data files that are corrupt or terminated improperly. Second, a copy of data should be current enough to avoid data staleness by avoiding too much time between copying such that the copied data is still useful should it be needed. For certain applications, such as networks that store financial transactions, copies a week old may be useless, and much more frequent copying may be needed.

In an attempt to accommodate such storage requirements, certain systems through all the files in a computer network, or through a selected set of critical files, and check the time information of each file. If data has been written to the file since the last time the system checked the file's status, then a copy of the file is sent to a storage system. One problem with such systems is that they typically do not work for data kept in very large files. For example, assuming that a copy could be made of the very large database, the time needed to make copies of such a large database may render data shadowing impractical. Making numerous copies of a large database not only takes a tremendous amount of time, but also requires a tremendous amount of storage space.

Another approach that has been attempted in order to overcome some of these limitations is a process whereby a time sequence of data is captured and saved. For example, many systems incorporate disk mirroring or duplexing. In disk mirroring or duplexing, changes made to a primary mass storage system are sent to other backup or secondary mass storage systems. In other words, when a data block is written to the primary mass storage system, the same data block is written to a separate secondary mass storage system. By copying each write operation to a second mass storage system, two mass storage systems may be kept synchronized so that they are virtually identical at approximately the same time. Because an entire disk volume is being copied, however, mirroring also requires a tremendous amount of storage space and utilizes a large amount of processing resources.

Furthermore, each of the above-described processes for copying or backing up data can have a significant impact on the source or primary system. For example, processing resources of the source system may be expended in copying data to a destination system rather than being used to process application requests.

SUMMARY OF THE INVENTION

In view of the foregoing, a need exists for improved systems and methods for the copying and/or replication of data in computing systems. In particular, a need exists for systems and methods that reduce the impact (e.g., processing load) on a source, or primary, system when performing one or more data management and/or storage operations on data, such as, for example, application-specific data.

In certain embodiments of the invention, systems and methods are disclosed for performing substantially continuous replication of application-specific data in a computer network environment. In certain embodiments, systems and methods may further perform one or more data management operations on the replicated data in order to avoid burdening the source system. For example, one or more storage operations may be performed on replicated data that represents a recoverable state, or "known good state" of a particular application running on the source system.

For instance, in certain embodiments, known good replication copies may be viewed as copies of production volume data. This feature allows a management component in the computing system to directly access, copy, restore, backup or otherwise manipulate the replication copies of production data as if the data was the production data of the source system, thereby improving various system performance characteristics such as access time, reducing memory requirements and reducing impact on source, or client, applications.

In certain embodiments, the replication copies of the production data include time information (such as one or more time stamps) that indicates the client system time when the production data was modified and/or when the subject application was in a known good state. Such time stamps are then associated with the replication data and/or copies of the replicated data, thereby allowing for the synchronization of time references between the production data and copies of the replicated data.

Accordingly, certain embodiments of the invention may recognize points within application data that represent a known good state of the application. This information is then used by the replication system to intelligently replicate sections of application data that represent a recoverable state rather than the rote copying of certain blocks of data based on hardware capacity and/or criteria that are unrelated to application recoverability. Thus, in certain embodiments, one benefit of the systems and methods provided herein is the ability to replicate data on an application-specific basis rather than merely copying certain physical blocks of information based on buffer size, file type or copying other uncoordinated groups of data.

In certain embodiments, a method is disclosed for performing data management operations in a computer network. The method comprises monitoring: operations associated with an application that are operative to write data to a first storage device; inserting in a log file a marker comprising time information identifying a time of a known good state of the application; copying the data to a second storage device based at least in part on the operations; generating a snapshot of the copied data at a time after the data has been copied to the second storage device; and associating the snapshot of the copied data with the time information identifying the time of the known good state of the application.

In certain further embodiments, the above-disclosed method additionally comprises performing a backup or other storage operation on the snapshot and associating the resulting copy of the snapshot with the time information identifying the time of the known good state of the application.

In certain embodiments, a system is disclosed for performing data management operations in a computer network environment. The system comprises at least one computer application configured to execute on a source computer and a first storage device coupled to the source computer to receive data write operations from the at least one computer application. The system further comprises a second storage device and at least one module configured to monitor the data write operations and to generate log entries based on the data write operations, at least one of the log entries having a time stamp indicative of a time of a known good state of the at least one computer application. The system also comprises a replication module coupled to the second storage device, wherein the replication module is configured to: process, based on the log entries, the data write operations to replicate data to a first location on the second storage device; perform a storage operation on the replicated data at the first location on the second storage device to copy data to a second location different than the first location, and logically associate the copied data at the second location with the time stamp indicative of the time of the known good state of the at least one computer application.

In certain embodiments, a method is disclosed for performing data management operations in a computer network. The method comprises monitoring data operations associated with an application, the data operations operative to write data to a first storage device and populating a first log file with data entries indicative of the data operations. The method also comprises: inserting in the first log file a marker indicative of a known good state of the application, the marker including a time information identifying a time of the known good state of the application; replaying to a second storage device the data operations based on the data entries to replicate data to a first location on the second storage device; performing a storage operation on the replicated data to copy the replicated data from the first location to a second location; and associating the copy of the replicated data at the second location with the time information identifying the time of the known good state of the application.

In certain embodiments, a system is disclosed for copying data in a computer network. The system comprises: means for monitoring data operations generated by a single computer application that are operative to write data to a first storage device; means for storing data entries indicative of the data operations; means for inserting in the storing means a marker indicative of a known good state of the computer application, the marker including a time stamp associated with a source system time of the known good state of the computer application; means for processing, based on the data entries, in a second storage device the data operations to replicate data to a first location on the second storage device; means for performing a storage operation on the replicated data in the second storage device to copy the replicated data to a second location; and means for associating the copy of the replicated data with the time stamp associated with the source system time of the known good state of the computer application.

In certain embodiments, a method is disclosed for monitoring a computer application to perform data replication in a computer network. The method comprises: detecting data operations sent from a computer application to a file system on a source computer, the data operations operative to write data to a first storage device; populating a first log file with data entries indicative of the data operations; detecting a known good state of the computer application; quiescing, at the known good state of the computer application, the sending of the data operations to the file system; and inserting in the first log file a marker including time information identifying a time of the known good state of the computer application.

In certain further embodiments, quiescing of the above-disclosed method is performed at periodic intervals. For instance, the method may further include receiving user input for selecting the periodic intervals and/or the periodic intervals may be selected automatically. For instance, a frequency of the periodic intervals may be based at least in part on: a type of data associated with the computer application, an average failure rate of at least one computer in the computer network, a load of at least one computer in the computer network, an availability of at least one computer in the computer network, combinations of the same or the like.

In certain embodiments, a system is disclosed for generating application data for use in a data replication environment. The system comprises a monitor module configured to monitor data write operations of a computer application and to generate first log entries based on the data write operations, the monitor module being further configured to quiesce or buffer additional data write operations at a known good state of the computer application and to generate a second log entry having a time stamp indicative of a time of the known good state of the computer application. The system also comprises at least one log file in communication with the monitor module and configured to store the first and second log entries.

In certain embodiments, a system is disclosed for generating application data for use in a data replication environment. The system comprises: means for detecting data operations sent from a computer application to a file system, the data operations operative to modify data stored on a first storage device; means for storing data entries indicative of the data operations; means for quiescing, at a known good state of the computer application, the sending of additional data operations to the file system; and means for recording a time stamp identifying a time of the known good state of the computer application.

In certain embodiments, a method is disclosed for copying data generated on a source system in a computer network. The method comprises: processing, with one or more routines, at least one log file having a plurality of log entries indicative of operations generated by a computer application executing on a source system, the operations being directed to data on a source storage device; replaying, with the one or more routines, the operations on a destination storage device to replicate application-specific data to the destination storage device; suspending the replaying when the one or more routines encounters a consistency point marker in the at least one log file, the consistency point marker being indicative of a known good state of the computer application; and performing a storage operation on the replicated data when the replicated data represents the known good state of the computer application.

In certain embodiments, a destination system is disclosed for performing data replication in a computer network. The destination system comprises at least one replication log file and a replication module. The at least one replication log file further comprises: (i) a plurality of log entries indicative of data operations generated by a computer application for execution on a source storage device and (ii) at least one consistency point marker indicative of a known good state of the computer application. The replication module is configured to replicate data to a destination storage device and further comprises a replication agent and at least one process configured to traverse the plurality of log entries in the at least one replication log file and to copy the log entries to execute the data operations on the destination storage device, the at least one thread being further configured to notify the replication agent when encountering the at least one consistency point marker.

In certain embodiments, a system is disclosed for replicating data generated on a source device in a computer network. The system comprises: means for storing a plurality of log entries indicative of modification operations generated by a computer application executing on a source system, the modification operations being directed to data on a source storage device; means for traversing the storing means and for replaying the modification operations to replicate application-specific data to a destination storage device; means for suspending the replaying when the traversing and replaying means encounters a consistency point marker in the means for storing, the consistency point marker being indicative of a known good state of the computer application; and means for performing a storage operation on the replicated data when the replicated data represents the known good state of the computer application.

In certain embodiments, a method is disclosed for handling data to be copied in a computer network. The method comprises: monitoring operations associated with a single application executing on a source system; identifying from the operations a plurality of data modification operations operative to write data to a first storage device; buffering a copy of each of the plurality of data modification operations; forwarding the copies of the plurality of data modification operations to a destination system to be copied to a second storage device without first writing the copies of the plurality of data modification operations to the first storage device; and forwarding the plurality of data modification operations to a file system associated with the first storage device.

In certain embodiments, a system is disclosed for selecting application data to be copied in a computer network. The system comprises a buffer, at least one computer application configured to generate operations associated with data on a first storage device, and a filter module disposed between the at least one computer application and the first storage device, the filter module configured to identify from the operations a plurality of data modification operations. The system further comprises a network redirector component in communication with the filter module and configured to temporarily store a copy of the data modification operations in the buffer while allowing the data modification operations to pass through to the first storage device, the network redirector component being further configured to transmit the copies of the plurality of data modification operations to a destination system, to be copied to a second storage device, without first writing the copies of the plurality of data modification operations to the first storage device.

In certain embodiments, a system is disclosed for acquiring data for replication on a network storage device. The system comprises means for generating operations associated with data on a first storage device and means for identifying from the operations a plurality of data modification operations, the means for identifying being disposed between the means for generating and the first storage device. The system further comprises means for temporarily storing a copy of the data modification operations while allowing the data modification operations to pass through to the first storage device, the means for storing being further configured to transmit the copies of the plurality of data modification operations to a destination system, to be replicated to a second storage device, without writing the copies of the plurality of data modification operations to the first storage device.

In certain embodiments, a method is disclosed for performing pathname translation in a data replication system. The method comprises: receiving a log entry, to be replicated on a destination system, that identifies a data management operation and an inode associated with a source system location corresponding to the data management operation, the inode being one of a plurality of inodes on the source system; accessing a database comprising path data associating each of the plurality of inodes with a short name and a parent inode; constructing from the path data an absolute pathname on the destination system that corresponds to the inode of the log entry; and forwarding the log entry and the absolute pathname to the destination system.

In certain embodiments, a system is disclosed for performing pathname translation during data replication in a computer network. The system comprises a database, at least one log entry and a database process. In certain embodiments, the database comprises path data that associates each of a plurality of inodes on a source system with a short name and a parent inode. The at least one log entry identifies a data management operation and at least one corresponding inode of the plurality of inodes. The database process is configured to receive the at least one log entry and to access the database to translate the at least one corresponding inode to a pathname identifying a location on a destination system corresponding to the data management operation.

In certain embodiments, a system is disclosed for performing translation from an inode to a pathname in a data storage network. The system comprises: means for storing path data associating each of a plurality of inodes on a source system with a short name and a parent inode; means for identifying data management operations and at least one of the plurality of inodes that corresponds to each data management operation; and means for accessing the storing means to translate the at least one inode to a pathname identifying a location on a destination system corresponding to each data management operation.

In certain embodiments, a method is disclosed for transmitting data from a source computer to a destination computer in a data replication system. The method comprises: monitoring file system requests of an application on a source computer; identifying, from the file system requests, data management operations directed to data on a first storage device; and storing in a buffer a plurality of log entries representing the data management operations. The method further comprises: sequentially processing each of the plurality of log entries; transmitting each processed log entry to a destination computer; replaying each processed log entry to replicate the data on the first storage device to a second storage device; and when said sequentially processing drops below a predetermined rate, disk swapping most recently received log entries from the buffer to a memory.

In certain embodiments, a system is disclosed for transmitting data to be replicated in a computer network. The system comprises a queue, a buffer and a monitor module configured to monitor file system requests generated by a computer application, the monitor module being further configured to populate the queue with log entries indicative of file system requests comprising data management operations to be executed on a first storage device. The system further comprises a first thread configured to transfer the log entries from the queue to the buffer and a second thread configured to retrieve the log entries from the buffer, process the log entries, and forward the processed log entries to a destination system for replaying the log entries to replicate data on a second storage device. In certain embodiments, the monitor module is further configured to throttle the computer application when a rate at which the second thread processes the log entries is below a predetermined rate.

In certain embodiments, a system is disclosed for transmitting data to be replicated in a network environment. The system comprises: means for monitoring file system requests of an application on a source computer and for identifying, from the file system requests, data management operations directed to data on a first storage device; means for storing a plurality of log entries representing the data management operations; means for sequentially processing each of the plurality of log entries; means for transmitting each processed log entry to a destination computer; means for replaying each processed log entry to replicate the data on the first storage device to a second storage device; and means for disk swapping most recently received log entries from the storing means to a memory when said sequentially processing falls below a predetermined rate.

In certain embodiments, a system is disclosed for facilitating data synchronization following a network failure in a data replication environment. The system comprises: a plurality of log entries representing data management operations generated by an application for data on a first storage device, each of the plurality of log entries including a unique identifier; a cache memory configured to store a portion of the plurality of log entries such that when a size of the portion of log entries exceeds a storage threshold of the cache memory, the cache memory deletes one or more of the least recently received log entries until the size is less than the storage threshold; at least one destination computer configured to process the plurality of log entries to replicate data to a second storage device, the at least one destination computer being further configured to record the unique identifier of a most recently processed log entry; and at least one replication routine configured to sequentially retrieve each of the plurality of log entries from the cache memory and to forward each log entry to the at least one destination computer without waiting for an acknowledgement from the at least one destination computer.

In certain embodiments, a method is disclosed for performing data replication in a computer network. The method comprises: storing log entries in a first-in first-out memory, wherein each of the log entries includes a unique identification and represents a data management operation generated by an application for data on a first storage device; maintaining in the first-in first-out memory a history of the log entries stored therein such that the storage amount occupied by the history of the log entries is less than a storage threshold; transmitting a copy of each log entry from the first-in first-out memory to at least one destination computer; replaying the copies of the log entries received by the at least one destination computer to replicate the data management operations on data on a second storage device; and storing on the at least one destination computer the unique identification of the most recently replayed log entry.

In certain embodiments, a system is disclosed for facilitating data synchronization following a network failure in a data replication environment. The system comprises: means for representing data management operations generated by an application for data on a first storage device, each of the means for representing including a unique identifier; means for storing a portion of the means for representing such that when a size of the portion of the means for representing reaches a storage threshold of the means for storing, the means for storing deletes one or more of the oldest means for representing until the size is less than the storage threshold; means for processing the means for representing to replicate data to a second storage device, the means for processing being further configured to record the unique identifier of a most recently processed means for representing; and means for sequentially retrieving log entries from the means for storing, the means for retrieving being further configured to forward each means for representing to the means for processing without waiting for an acknowledgement from the means for processing.

In certain embodiments, a system is disclosed for identifying and replicating software application data representative of a known good state. The system comprises a data agent associated with a software application that identifies data to be replicated indicative of the known good state, wherein the data representative of the known good state is indicated by a consistency point, or marker, in the data. The system further includes a replication module that copies the data representative of the known good state to a storage device based on the consistency point.

According to certain embodiments, a system and method are provided for creating consistency points in a replication volume, whereby the replication volume may be created by application-specific replication processes. In other words, the user may establish a storage policy that identifies storage operations that may be performed using different types of replication copies. In some instances, it may not be advantageous to replicate an entire volume. For example, viewable data may be the only data that is replicated (e.g., SQL data). Therefore, an application-specific storage policy associated with replication may be created in combination with journal (e.g., all file system logs) logging operations for the purposes of generating application-specific replication.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 12 illustrates an exemplary embodiment of a pathname translation database usable with embodiments of the pathname translation system of FIG. 11.

DETAILED DESCRIPTION OF THE PREFERRED EMBODIMENTS

Figure 1:
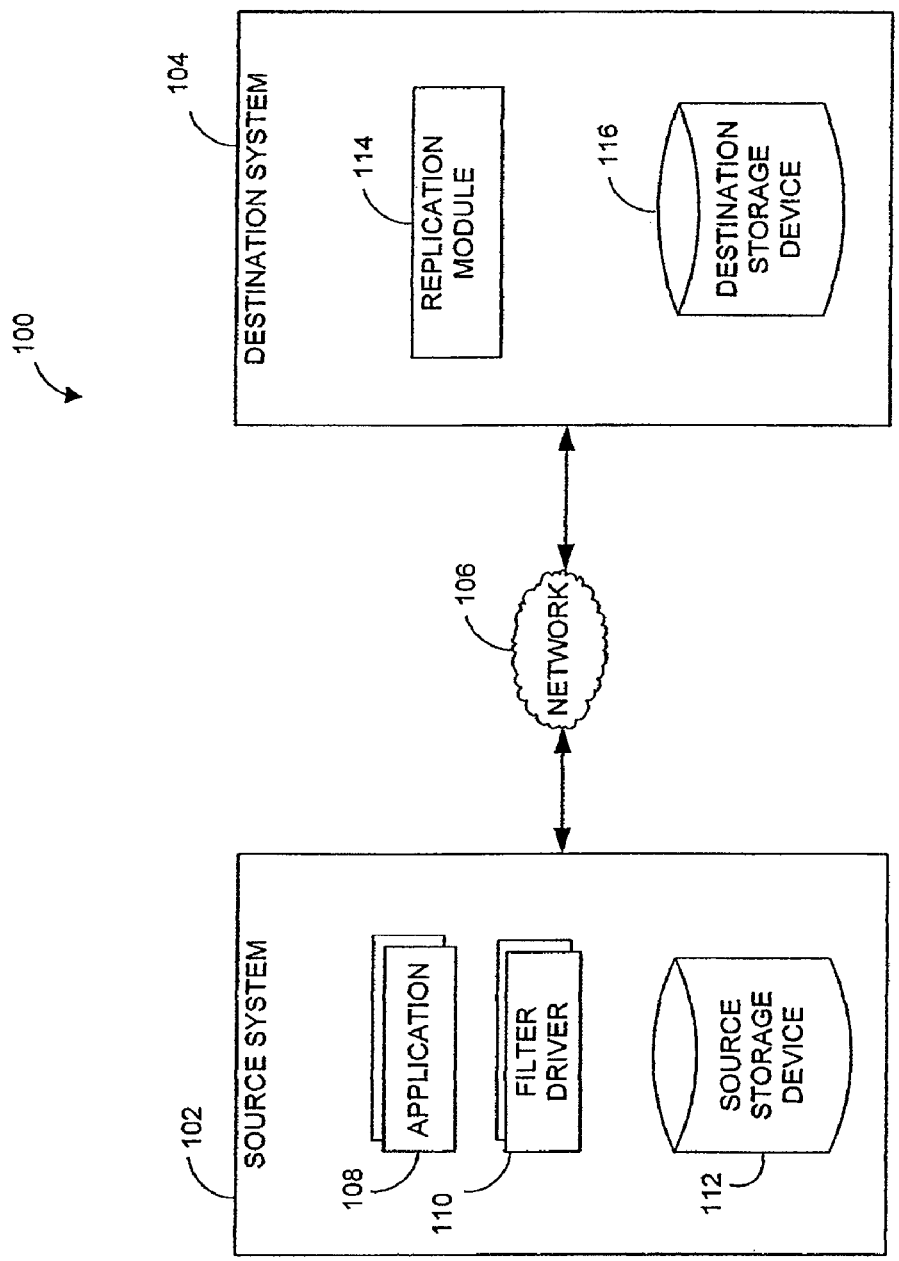
FIG. 1 illustrates a block diagram of a replication system according to certain embodiments of the invention.

As will be seen from the disclosure herein, certain embodiments of systems and methods are provided for intelligent data replication. In particular, embodiments of the invention include the replication of application-specific data from a source system to a destination system. For example, one or more modules executing on the source system may monitor data management operations (such as data modification operations) of a specific application and generate log entries indicative of the operations. The log entries may then be copied to and processed, or replayed, by a destination system to replicate data in one or more replication volumes, the replicated data being a copy of the application data stored on a source storage device.

In certain embodiments, the replication systems and methods disclosed herein are further configured to identify a known good, or recoverable, state of the application. For instance, the replication systems and methods may determine appropriate points within certain application data at which certain information is collected to reliably restore the application as of a particular point in time. At certain known good states, the replication system quiesces the application and/or generates a consistency point marker having time information, such as, for example, a time stamp, indicating the source system time of the application's known good state.

When replicating the data, the destination system utilizes the consistency point markers to identify when the replicated data represents the known good state of the application. The destination system is further capable of performing one or more data management operations, such as, for example, storage operations (e.g., snapshot, backup), search operations, data classification, combinations of the same or the like on the replicated data at certain consistency points. Performing data management operations on the replicated data allows for the processing of copies of application data without significantly impacting the resources of the source system. Furthermore, when copying the replicated data at consistency points, the copied data presumably represents a known good state of the application.

Using the time information of one or more consistency point entries, the destination system is further capable of logically associating the copied data (e.g., a snapshot of the replicated data) with the source system time of the known good state of the application. That is, even though the copy of the replicated data occurs at some point after the replication of the production (source system) data, the copied data is associated with the (earlier) source system time of the consistency point entry (e.g., the source system time of the known good state of the application. As a result, the copy of the replicated data, which is logically associated with the source system time of the known good state of the application, appears as if the copy was directly performed on the production (source system) data. In certain embodiments, this method advantageously allows for further processing of the copied data (e.g., processing of snapshots of the replicated data) without touching the data of the source system.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

FIG. 1 illustrates a block diagram of a replication system 100 according to certain embodiments of the invention. As shown, the replication system 100 comprises a source system 102 capable of communicating with a destination system 104 by sending and/or receiving data over a network 106. For instance, in certain embodiments, the destination system 104 receives and/or stores a replicated copy of at least a portion of data, such as application-specific data, associated with the source system 102.

The illustrated network 106 advantageously comprises any means for communicating data between two or more systems or components. It certain embodiments, the network 106 comprises a computer network. For example, the network 106 may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like. In embodiments wherein the source system 102 and destination system 104 are part of the same computing device, the network 106 may represent a communications socket or other suitable internal data transfer path or mechanism.

As shown, the source system 102 comprises one or more applications 108 residing on and/or being executed by a computing device. For instance, the applications 108 may comprise software applications that interact with a user to process data and may include, for example, database applications (e.g., SQL applications), word processors, spreadsheets, financial applications, management applications, e-commerce applications, browsers, combinations of the same or the like. For example, in certain embodiments, the applications 108 may comprise one or more of the following: MICROSOFT EXCHANGE, MICROSOFT SHAREPOINT, MICROSOFT SQL SERVER, ORACLE, MICROSOFT WORD and LOTUS NOTES.

The source system 102 further comprises one or more processes, such as filter drivers 110, that interact with data (e.g., production data) associated with the applications 108. For instance, the filter driver 110 may comprise a file system filter driver, an operating system driver, a filtering program, a data trapping program, an application, a module of the application 108, an application programming interface ("API"), or other like software module or process that, among other things, monitors and/or intercepts particular application requests targeted at a file system, another file system filter driver, a network attached storage ("NAS"), a storage area network ("SAN"), mass storage and/or other memory or raw data. In same embodiments, the filter driver 110 may reside in the I/O stack of the application 108 and may intercept, analyze and/or copy certain data traveling from the application 108 to a file system.

In certain embodiments, the filter driver 110 may intercept data modification operations that include changes, updates and new information (e.g., data writes) with respect to the application(s) 108 of interest. For example, the filter driver 110 may locate, monitor and/or process one or more of the following with respect to a particular application 108, application type or group of applications: data management operations (e.g., data write operations, file attribute modifications), logs or journals (e.g., NTFS change journal), configuration files, file settings, control files, other files used by the application 108, combinations of the same or the like. In certain embodiments, such data may also be gathered from files across multiple storage systems within the source system 102. Furthermore, the filter driver 110 may be configured to monitor changes to particular files, such as files identified as being associated with data of the applications 108.

In certain embodiments, multiple filter drivers 110 may be deployed on a computing system, each filter driver being dedicated to data of a particular application 108. In such embodiments, not all information associated with the client system 102 may be captured by the filter drivers 110 and, thus, the impact on system performance may be reduced. In other embodiments, the filter driver 110 may be suitable for use with multiple application types and/or may be adaptable or configurable for use with multiple applications 108. For example, one or more instances of customized or particularizing filtering programs may be instantiated based on application specifics or other needs or preferences.

The illustrated source system 102 further comprises a source storage device 112. The source storage device 112 may include any type of media capable of storing data. For example, the source storage device 112 may comprise magnetic storage (such as a disk or a tape drive) or other type of mass storage. In certain embodiments, the source storage device 112 may be internal and/or external to (e.g., remote to) the computing device(s) having the applications 108 and the filter drivers 110.

As further illustrated in FIG. 1, the destination system 104 comprises a replication module 114 and a destination storage device 116. In certain embodiments, the replication module 114 is configured to monitor and/or manage the copying of data from the source system 102 to the destination system 104, such as data retrieved by the filter drivers 110. In yet other embodiments, the replication module 114 is a "dumb" server or terminal that receives and executes instructions from the source system 102.

The destination storage device 116 may include any type of media capable of storing data, such as replication data sent from the source system 102. For example, the destination storage 116 device may comprise magnetic storage (such as a disk or a tape drive) or other type of mass storage. In certain embodiments, the destination storage device 116 may be internal and/or external to the computing device(s) having the replication module 114.

In certain embodiments, the source storage device 112 and/or the destination storage device 116 may be implemented as one or more storage "volumes" that include physical storage disks defining an overall logical arrangement of storage space. For instance, disks within a particular volume may be organized as one or more groups of redundant array of independent (or inexpensive) disks (RAID). In certain embodiments, either or both of the storage devices 112, 116 may include multiple storage devices of the same or different media.

Figure 2A:
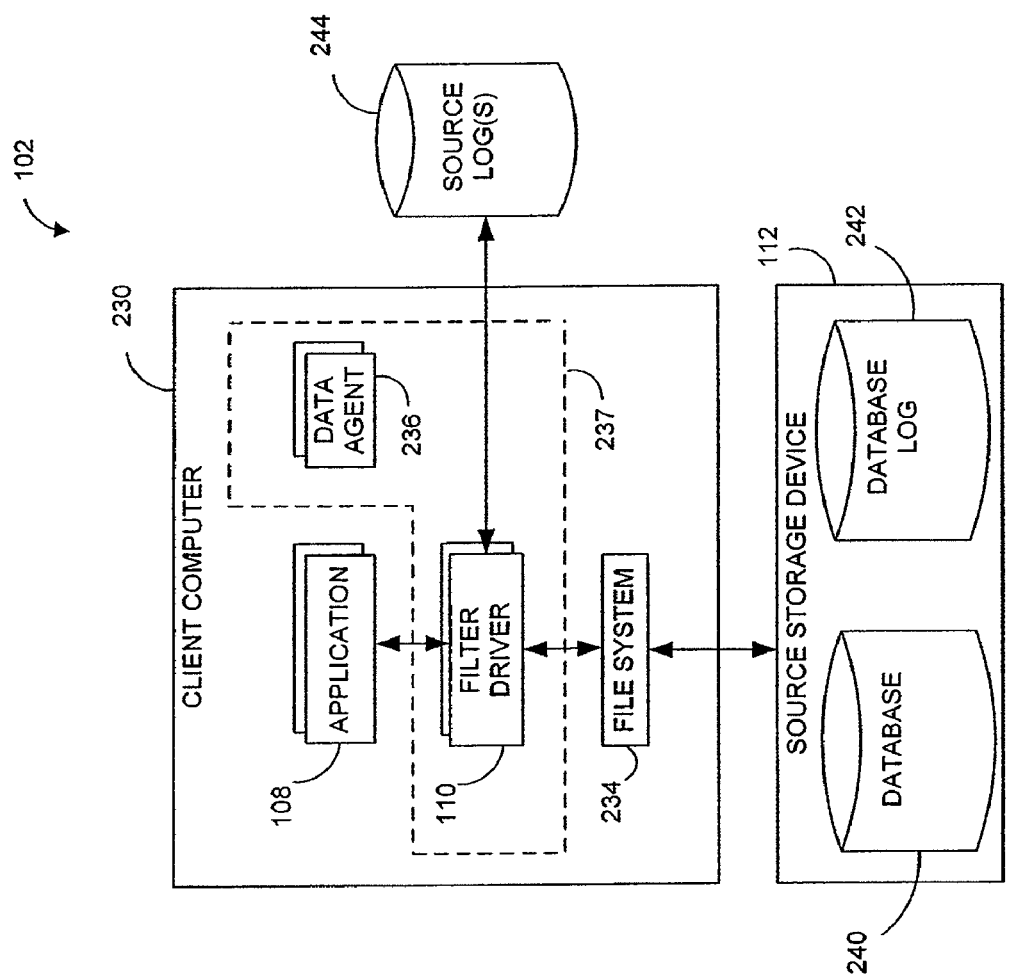
FIG. 2A illustrates a block diagram of an exemplary embodiment of a source system of the replication system of FIG. 1.

FIG. 2A illustrates a block diagram of an exemplary embodiment of the source system 102 of FIG. 1. In particular, the source system 102 comprises a client computer 230 on which the application(s) 108 and the filter driver(s) 110 reside and/or are executed. In certain embodiments, the client computer 230 comprises any computing device capable of processing data and includes, for example, a server computer, a workstation, a personal computer, a cell phone, a portable computing device, a handheld computing device, a personal digital assistant (PDA) or the like.

The illustrated client computer 230 further comprises a file system 234 for organizing files and directories accessible by the client computer 230. In certain embodiments, the file system 234 comprises a data structure usable to keep track of a collection of files and/or directories stored on the source storage device 112. The file system 234 may include, for example, a local file system, a network file system, a file server, a management program or the like, or may include multiple file systems accessible by an operating system. For instance, in embodiments wherein the storage device 112 is associated with multiple volumes, each volume may be associated with its own file system 234, or a single file system 234 may span across the multiple volumes.

In certain embodiments, the file system 234 comprises a "write in-place" file system, an example of which is the "fast file" system. In a write in-place file system, the locations of the data structures, such as data blocks, and other descriptive information on disk are typically fixed. Certain data structures are used to store information (e.g., metadata) about a file, whereas the data blocks are structures used to store the actual data for the file. The information contained in certain data structures may include, for example, ownership of the file, access permission for the file, size of the file, file type, references to locations on disk of the data blocks for the file, combinations of the same or the like. The references to the locations of the file data may be provided by pointers, which may further reference indirect blocks that, in turn, reference the data blocks, depending upon the quantity of data in the file. In certain embodiments, changes are made "in-place" in accordance with the write in-place file system. If an update to a file extends the quantity of data for the file, an additional data block is allocated and the appropriate management files are updated to reference that data block.

The illustrated client computer 230 also comprises one or more data agents 236. In certain embodiments, the data agent 236 comprises a module responsible for performing data and/or storage tasks related to the client computer 230. For example, the data agent 236 may manage and/or coordinate the compilation of and/or transferring of replication data from the source system 102. In other embodiments, the data agent 236 may provide archiving, migrating, and/or recovery of client computer data.

In certain embodiments, the client computer 230 comprises a plurality of data agents 236, each of which performs data management operations related to data associated with each application 108. In such embodiments, the data agent 236 may be aware of the various files, folders, registry files and/or system resources that are impacted by a particular application 108. For instance, the data agent 236 may be programmed to detect data management requests by a particular application 108 and determine which files, folders and/or system resources are associated with the data management requests.

In certain embodiments, different individual data agents 236 may be designed to handle MICROSOFT EXCHANGE data, LOTUS NOTES data, MICROSOFT WINDOWS 2000 file system data, MICROSOFT ACTIVE DIRECTORY OBJECTS data, and other types of data. In certain further embodiments, one or more data agents 236 may be configured to backup, migrate, and/or recover application-specific data.

For example, in embodiments wherein the source system 102 comprises a MICROSOFT EXCHANGE 2000 server, the source system 102 may use multiple data agents 236 to perform storage operations (e.g., backup, migrate, replication or restore operations). For instance, a MICROSOFT EXCHANGE 2000 mailbox data agent may be used to replicate EXCHANGE 2000 mailbox data; a MICROSOFT EXCHANGE 2000 database data agent may be used to replicate EXCHANGE 2000 database data; a MICROSOFT EXCHANGE 2000 public folder data agent may be used to replicate EXCHANGE 2000 public folder data; and a MICROSOFT WINDOWS 2000 file system data agent may be used to replicate file system data.

In certain embodiments, multiple data agents 236 may be treated as separate data agents even though they reside on the same client computer 230. In other embodiments, the separate data agents may be combined to form a virtual data agent for performing storage operations related to a specific application. Thus, the four separate data agents of the above example may be combined as a virtual data agent suitable for performing storage operations related to MICROSOFT EXCHANGE 2000 data.

In certain embodiments, the data agent 236 is configured to perform data management operations in accordance with one or more "storage policies" or other preferences. A storage policy may include a data structure or other information having a set of preferences and other storage criteria for performing a storage operation. The preferences and storage criteria may include, but are not limited to, information regarding storage locations, relationships between system components, network pathways, retention policies, data characteristics, compression or encryption requirements, preferred system components, combinations of the same or the like.

In certain embodiments, one or more data agents 236 are configured to perform an initial "seeding" process of a replication process. For example, prior to (or concurrently with) data replication using one or more filter drivers 110, the data agent 236 may perform a scan of the source system 102 (e.g., the source storage device 112). For instance, the data agent 236 may evaluate the folders and/or directory structure of the source system 102 to determine which folders are used by a particular application 108. In certain embodiments, the data agent 236 may also identify, arrange, and queue necessary data of the application 108 to provide a proper platform for replication. For example, the data agent 236 may populate source log(s) 244 with application data that has already been written to the source storage database 112.

In certain embodiments, when the data agent 236 is initially installed or enabled on the client computer 230, the data agent 236 may evaluate the application 108. For instance, the data agent 108 may determine the application's organizational structure, which may include, for example, folder, directory and file information. The information gathered by the data agent 236 may be sufficient to define a complete "set" of information to be replicated such that suitable baseline data representing the current operational state of the application 108 is identified. In some instances, this initial process may require the examination and identification of data related to application operations occurring prior to the installation of data agent 236. The data agent 236 may also be configured to identify general configuration and operational information regarding the application 108. In certain embodiments, the data agent 236 may be configured to access and/or monitor particular files, folders, directories, registries, preferences and/or other like data structures for information to be replicated. All or a portion of the information gathered by the data agent 236 may be copied over to the destination system 104 as part of the initial seeding or initialization process. After the seeding process is complete, data replication may occur on a substantially continuous basis based on data transfers occurring between application(s) 108 and source storage device 112. In certain embodiments, the seeding process may occur substantially concurrently with execution of the application(s) 108. For instance, data operations from the application(s) 108 may be temporarily stored in a queue or buffer until the seeding process, or a portion thereof, is complete.

In certain embodiments, the data agent 236 may be configured to evaluate an application 108, and based on certain system management parameters and/or other considerations associated with the application 108 (e.g., data size, frequency of replication, system or user preferences, etc.), the data agent 236 may "map" or correlate the application data to one or more locations on the destination storage device 116. In other embodiments, the data agent 236 may communicate with other system components when making correlation decisions. For example, the data agent 236 may communicate with the replication agent 356 and/or an optional storage manager component when deciding how to map particular application data.

For example, the data agent 236 may map a certain application 108 to one location on the destination storage device 116, or may parse or separate application data for storage across multiple volumes of the destination storage device 116 depending on preferences or system management objectives. Parsing of data across multiple volumes may occur based on application type (certain applications spread across multiple volumes), data type, temporal considerations (e.g., data for a specified time period is stored on a particular volume), size considerations (e.g., data up to a certain size is stored on one volume), relative importance of data, conservation of memory space, combinations of the same or the like. Any suitable parsing criteria may be used if desired to facilitate recall, storage or management of application data.

As shown in FIG. 2A, the client computer 230 communicates through the file system 234 with the source storage device 112, which further includes a database 240 and database logs 242. In yet other embodiments, the client computer may communicate with NAS or the like. In certain embodiments, data referred to the source storage device 112 may be first written to a file in the database logs 242 and subsequently committed to the database 240 in accordance with data management techniques for enhancing storage operation performance. Moreover, although only one database 240 and one database log 242 are depicted in FIG. 2A, it will be understood that the source storage device 112 may comprise additional databases 240, database logs 242 and/or other directory and file storage structures to meet the storage needs of the client computer 230.

As illustrated in FIG. 2A, the filter driver 110 is advantageously located between the application 108 and the file system 234. For instance, the filter driver 110 may be deployed in the stack as an I/O buffer and/or process in the data path between the application 108 and the file system 234. In such embodiments, the filter driver 110 may intercept, snoop, supervise, trap, process or otherwise be cognizant of some or all operations (e.g., data modification operations, file modification operations, read operations and the like) from the application 108 to its associated location(s) on the source storage device 112.

For example, in certain embodiments, the filter driver 110 may communicate with an associated data agent 236 to determine where data for a particular application 108 will be stored (e.g., particular folders on the file system 234). In certain embodiments, the filter driver 110 and/or the data agent 236 may also monitor and/or parse data management operations to determine if new or additional folders are affected by the production volume data of the particular application 108. In certain embodiments, the data agent 236 may monitor data management operations and/or other data for other purposes, such as, for example, for satisfying a query or command by a storage manager component or the like.

As further depicted in FIG. 2A, one or more of the filter drivers 110 and associated data agent(s) 236 may be grouped together as a single module, such as driver module 237. In yet other embodiments, the data agent(s) 236 may be separate from the driver module 237.

As discussed above, in certain embodiments, the filter driver 110 is preferably configured to monitor and/or filter data management operations associated with a particular application 108. The filter driver 110 may be further configured, according to predefined criteria, to cause particular data to be written to one or more source logs 244 for subsequent replication. For instance, the filter driver 110 may be configured to intercept, scrub, parse and/or trap data management operations and to populate the source logs 244 with changes associated therewith.

In certain embodiments, the filter driver 110 may examine the data management operation in progress, determine whether the type of operation is one of interest for replication purposes, and/or copy select or all data to source log 244. For instance, as discussed above, the filter driver 110 may determine if the data management operation concerns data in one or more files determined as relevant to replication (e.g., files that may store data for a particular application). In other embodiments, the filter driver 110 may generate log entries for all data management operations.

The filter driver 110 may further process and/or traverse the data and copy, generate or examine other relevant information, such as a log entry number, time information (e.g., time stamp), application type, data size and start field, combinations of the same or the like, that may be useful in the replication process. In other embodiments, the filter driver 110 may monitor files on the source storage device 112 for modifications of data relating to the subject application 108. For instance, as disclosed above, the filter driver 110 may monitor a select group of files, which have been associated with the application 108, or folders to detect changes to data stored therein. In certain embodiments, the filter driver 110 or other system component may detect when a data write operation of the application is made to a file or folder not in the select group. The filter driver 110 or other system component may then determine from the properties of the data write modification if the subject folder or file should be added to the select group (for subsequent monitoring).

In certain embodiments, the filter driver 110 is deployed (e.g., by data agent 236) on the client computer 230 prior to the beginning of the replication process. In embodiments wherein the filter driver 110 is deployed after replication begins, pertinent application data already stored on the source storage device 112 may be copied to the source logs 244 prior to the replication process (e.g., during the initial "seeding" process described above).

In certain embodiments, the filter driver 110 may be enabled and/or disabled by the data agent 236. For instance, enabling the filter driver 110 may allows it to populate an associated source log 244 with log entries from application data passed from the application 108 to the source storage device 112. When the filter driver 110 is disabled, data may pass directly through to the source storage device 112 without being copied to the source logs 244.

The source log 244 comprises any type of memory capable of storing one or more journal or log entries. In certain embodiments, the source log 244 comprises a cache memory. The source log 244 may reside on the source system 102, such as, for example, on the source storage device 112, or at least a portion of the source log 244 may be external to the source system 102.

In certain embodiments, the data agent 236 monitors the storage capacity of the source logs 244. For instance, when one or more of the source logs 244 reach a particular memory threshold, the data agent 236 may open a socket and communicate to the destination system 104 that a copy of the source log 244 is ready to be transmitted. In other embodiments, the data agent 236 may be configured to copy the source log 244 to the destination system 104 at periodic intervals or in accordance with other predefined criteria.

Figure 2B:
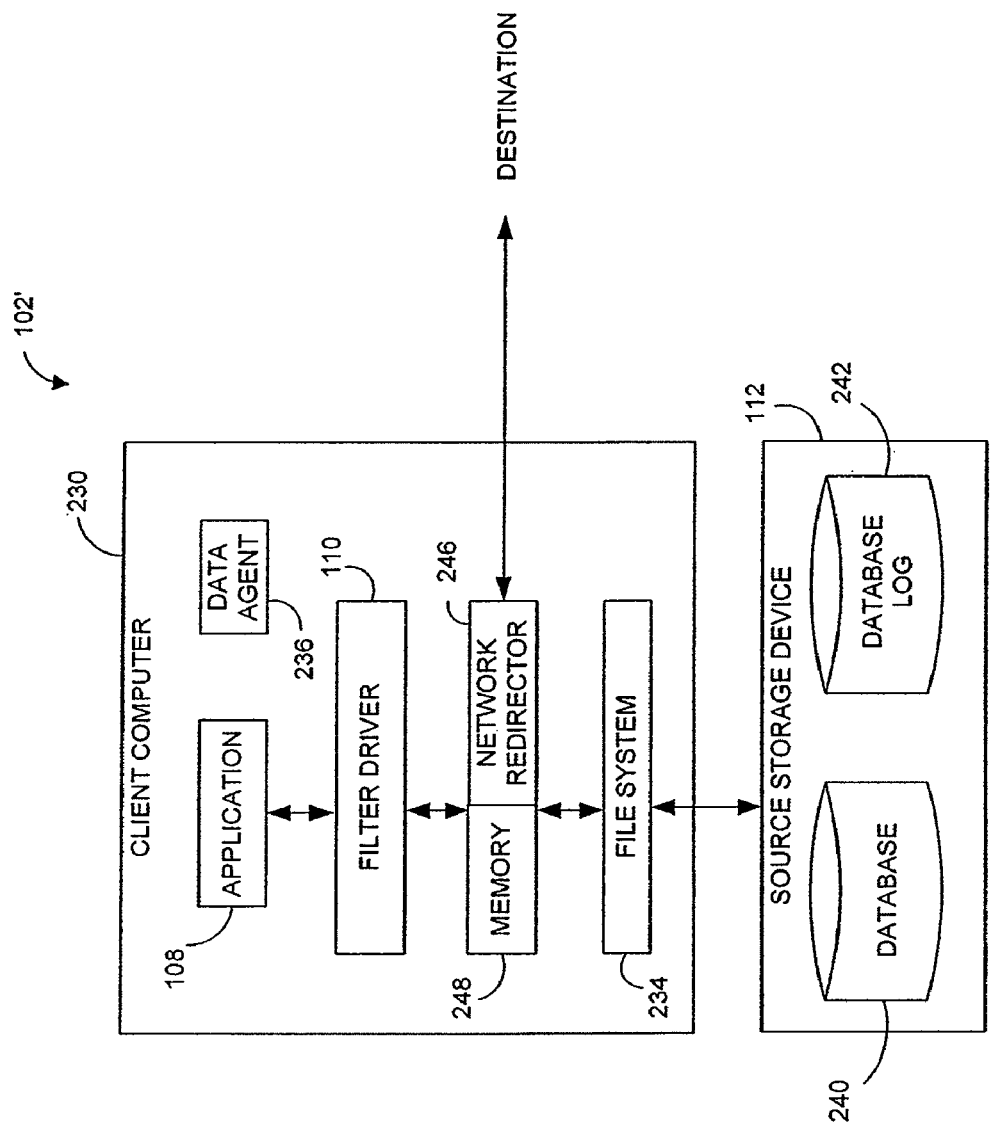
FIG. 2B illustrates a block diagram of another embodiment of a source system usable with the replication system of FIG. 1 and having a network redirector module.

Although the source system 102 has been described above with reference to particular embodiments, other embodiments of the invention may include more or fewer components than those depicted in FIG. 2A. For example, FIG. 2B illustrates a block diagram of a source system 102' according to certain embodiments of the invention. As shown, the source system 102' comprises the client computer 230, application 108, filter driver 110, file system 234, source log 244, and source storage device 112 (which includes database 240 and database log 242).

The illustrated source system 102' further comprises a network redirector module 246 located between the filter driver 110 and the file system 234. In certain embodiments, the network redirector module 246 is advantageously capable of improving performance of the data replication system. In particular, the network redirector module 246 allows for a data management operation to be sent to a destination system (e.g., destination system 104 of FIG. 1) prior to and/or substantially concurrently with the data management operation being forwarded to the source storage device 112.

For example, with reference to FIG. 2B, when the application 108 issues a data write operation, the filter driver 110 identifies whether or not the data write operation is one of interest, such as according to particular criteria established by the data agent 236 and/or a storage manager module. If so, the filter driver 110 notifies the network redirector module 246.

The illustrated network redirector module 246 is configured to buffer a copy of the data write operation to a memory 248. For instance, in certain embodiments, the memory 248 comprises a queue, such as a first-in first-out queue, for receiving copies of the data write operations. In certain preferred embodiments, the memory 248 advantageously comprises a cache memory, such as a random access memory (RAM). In certain further embodiments, the memory 248 comprises a memory-mapped file that is shared with the filter driver 110 such that the filter driver 110 provides a copy of the data write operation directly to the memory 248.

In certain embodiments, the network redirector module 246 comprises a driver, such as a file system driver or an operating system driver, that sends data to a particular destination, such as a remote device (e.g., a destination system, a log, or the like). For instance, the network redirector module 246 may operate entirely in a kernel mode and may sit above the transport layer of a TCP/IP protocol. Such a configuration allows the network redirector module 246 to interact directly with the filter driver 110 without the need for user-to-kernel mode and kernel-to-user mode context switches.

In certain embodiments, the network redirector module 246 is further configured to access the memory 248 and transmit the copy of the data write operation to one or more destination systems through a network (e.g., network mirroring). For instance, the particular destination system may include a counterpart network component that receives the data write operation from the network redirector module 246 and forwards the replicated data write operation to a second storage device (e.g., destination storage device 116 of FIG. 1). During this time, the other copy of the data write operation from the application 108 is forwarded to the source storage device 112 for execution.

In certain embodiments, the network redirector module 246 improves performance of the source system 102 because data management operations are able to quickly pass through to the file system 234. That is, the network redirector module 246 may quickly cache a copy of the data management operation rather than writing a copy of the operation to disk (e.g., in the source log 244) prior to forwarding the operation to the source storage device 112.

In certain embodiments, the source system 102 communicates with the associated destination system to verify that the two systems are synchronized. For instance, the source system 102 may receive from the destination system an identification (e.g., unique serial number) of the data write operation currently being replicated by the destination system. The source system 102 may then compare the received identification with data write operation being forwarded to the source storage device 112.

Figure 3:
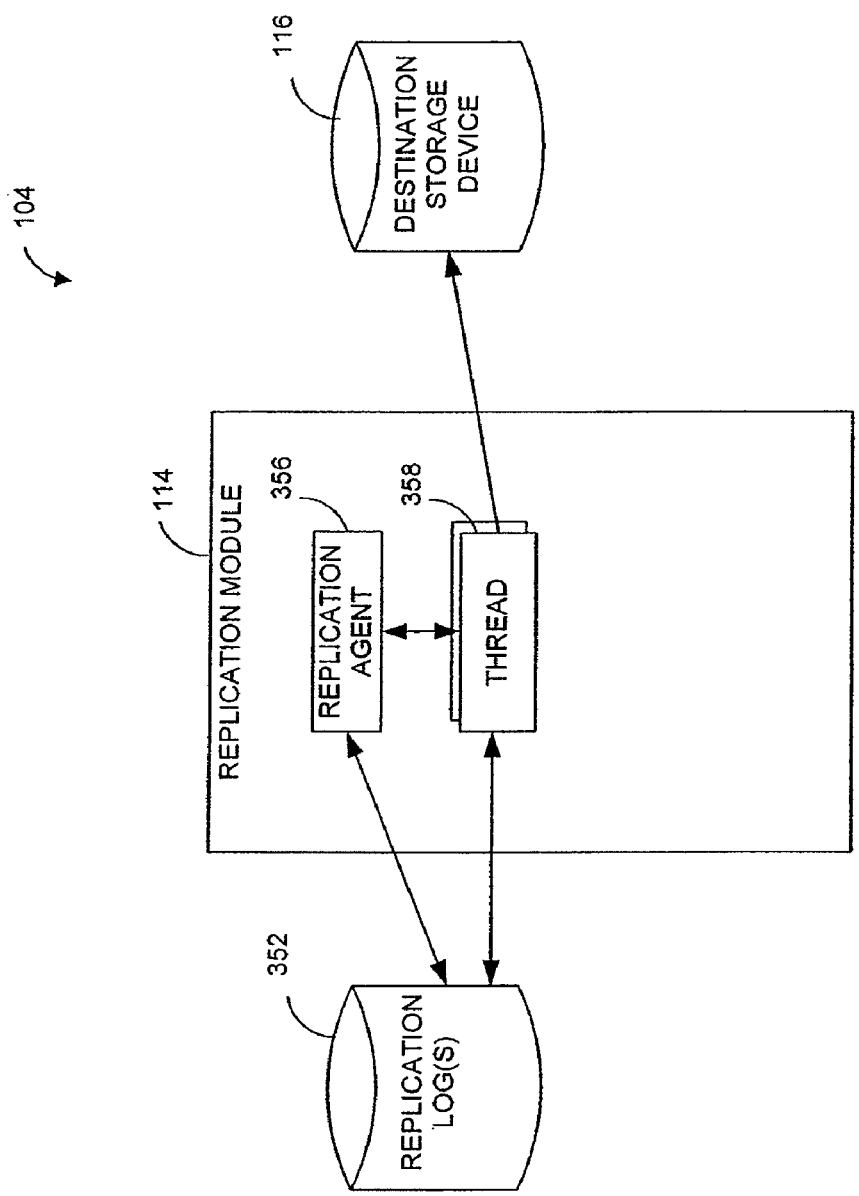
FIG. 3 illustrates a block diagram of an exemplary embodiment of a destination system of the replication system of FIG. 1.

FIG. 3 illustrates a block diagram of an exemplary embodiment of the destination system 104 of FIG. 1. In particular, the destination system 104 comprises the replication module 114, which communicates with one or more replication logs 352 and the destination storage device 116. In certain embodiments, the replication module 114 comprises any computing device capable of processing data and includes, for example, a server computer, a workstation, a personal computer or the like.

In certain embodiments, the replication logs 352 contain a copy of the data stored on the source logs of a client system, such as the source logs 244 of FIG. 2A. The replication logs 352 comprise any type of memory capable of storing data including, for example, cache memory. In certain embodiments, the replication logs 352 may reside on the destination system 104, such as, for example, on the destination storage device 116, or at least a portion of the replication logs 352 may be external to the destination system 104. In certain embodiments, once the replication logs 352 have been populated with the data from the source logs 244, the data on the source logs 244 is available to be erased and/or overwritten to conserve memory space.

The replication module 114 of the destination system 104 further comprises a replication agent 356 and one or more processes, such as threads 358. In certain embodiments, the replication agent 356 comprises one or more software modules that coordinate the transfer of data from the replication logs 352 to the destination storage device 116.

For example, in certain embodiments, the replication agent 356 instantiates an appropriate number of threads, processes, or routines, 358 for copying data from the replication logs 352 to the destination storage device 116. In certain embodiments, the number of threads 358 is based on one or more of the following factors: the number of logs files sent from the source logs 244 to the replication logs 352, information received from the data agent(s) 236, information generated by the filter driver(s) 110, and the type(s) of application data being tracked.

In certain embodiments, the replication agent 356 further includes mapping or correlation information that determines when and to where the data from the replication logs 352 is copied by the threads 358. In certain embodiments, such mapping information may be based on system- or user-defined parameters and/or may be automatically generated, such as based on the status of the destination storage device 116.

The one or more threads 358 (or processes) direct movement of data from replication logs 352 to the appropriate location on the destination storage device 116. In operation, in certain embodiments, the threads 358 advantageously process (or traverse) replication logs 352 for particular types of data and then copy that data to certain locations on one or more replication volumes based on data paths identified by the replication agent 356 and/or associated with each thread 358. For example, the thread(s) 358 may sequentially process each entry in the replication log 352 and write the associated data to the destination storage device 116.

In certain embodiments, one thread 358 may write to one or more volumes of the destination storage device 116 and/or multiple threads 358 may write to a single volume in parallel. Furthermore, one thread 358 may access one or more replication logs 352, and/or multiple threads 358 may access the same replication log 352.

In certain embodiments, each thread 358 is assigned to a hard-coded path pair, which includes (i) a source path identifying the location on the source storage device 112 associated with a data management operation (e.g., c:\Folder\) and (ii) a destination path identifying the location on the destination storage device 116 to receive the replicated data (e.g., D:\folder\) from the thread 358.

Figure 4:
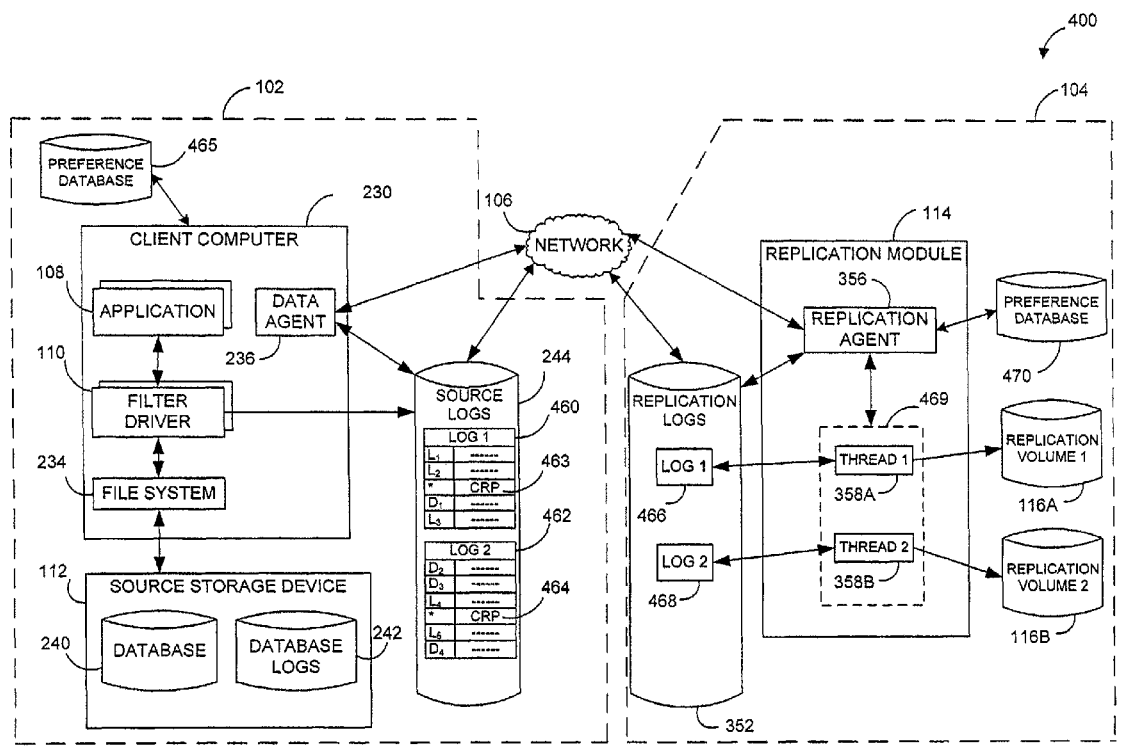
FIG. 4 illustrates a block diagram of further details of an exemplary embodiment of the replication system of FIG. 1.

FIG. 4 illustrates further details of a replication system 400 in accordance with certain embodiments of the invention. As illustrated, the replication system 400 comprises the source system 102 in communication with the destination system 104, portions of which are described in more detail with respect to FIGS. 1-3.

As detailed above, in certain embodiments, the filter driver 110 preferably substantially continuously populates data relating to one or more of the applications 108 to the source logs 244. As shown in FIG. 4, the source logs 244 further comprise a first log file 460 and a second log file 462. In certain embodiments, the filter driver 110 sequentially writes log entries to the source logs 244, and when a certain capacity of the first log file 460 is reached, the filter driver 110 begins populating the second log file 462 with log entries.

In yet other embodiments, data relating to each application 108 of interest may be written to a particular log file established for that application. For example, with reference to FIG. 4, the first log file 460 may relate to a first application of interest, whereas the second log file 462 may relate to a second application of interest.

In certain embodiments, each of the log files of the source logs 244 may be established by the data agent(s) 236 and/or the filter driver(s) 110 as part of an initial deployment or initialization process. Moreover, data may be written to the source logs 244 as determined by preferences stored on or accessed by the client computer 230 in a preference database 465.

For example, as further shown in FIG. 4, the first and second log files 460, 462 may comprise a series of entries, each having an identifier that indicates the sequence order and/or type of entry being made. For instance, the illustrated entry identifier ("L1") may indicate that the particular entry represents a first database entry in a particular order of operation. The illustrated entry identifier ("L2") may indicate a second database entry in a particular order of operation, and so forth. The illustrated entry identifier ("D1") may indicate that the particular entry represents a first database commit entry in a particular order of operation. Thus, in the example described above, the log entries identified by L1 and L2 may correspond to modifications associated with a particular database transaction, and the log entry identified by D1 may correspond to a commit command for the particular transaction.

In certain embodiments, the log entries are populated into the log files 460, 462, sequentially such that the relative order of the log entries corresponds generally to the order in which the associated data management operations were performed by the application 108. In other embodiments, the log entries may be populated into the log files 460, 462, in a non-sequential manner.

In certain embodiments, filter driver log entries may be copies or portions of some or all of the data operations outputted from application 108 to the source storage device 112. In yet other embodiments, the filter driver 110 and/or data agent 236 may construct log entries based solely on information available in the data stream between application 108 and the source storage device 112. In yet other embodiments, the log entries may include other system information, such as time stamp information. In still other embodiments, the log entries may be enriched with other useful system or application information available on the client computer 230 or within the client system 102. For example, the log entries may include metadata and/or data classification information that has been obtained from application data.

It will be understood that, although only two log files are shown in FIG. 4, more or fewer log files may be used with embodiments of the invention. For instance, multiple applications 108 may be monitored by the filter drivers 110 and, thus, additional log files may be added as necessary or desired. Moreover, although in some embodiments, each application 108 and each log file in the source logs 244 may have its own associated filter driver 110, in other embodiments, a single filter driver 110 may be deployed and configured for use with multiple applications 108 such that there are separate log files for each monitored application 108.

Additionally, it will be understood that it is not necessary for different log files to be established for each application 108. Rather, in certain embodiments, one or more "global" log files may be used, with data for each application 108 being placed in the global log file and marked as belonging to a particular application 108. With this arrangement, the replication system 400 may differentiate among data associated with different applications 108 based on data in one or more fields of the log entries, as is discussed in more detail below with respect to FIG. 5.

With continued reference to FIG. 4, in certain embodiments of the invention, the data agent 236 and/or filter driver 110 may be advantageously configured to pause, or quiesce, the application 108 during data replication. For instance, the data agent 236 may cause the application 108 to temporarily suspend data management operations to the source storage device 112 once the application 108 reaches a known "good," "stable" or "recoverable" state. In certain embodiments, such a state may be defined as when particular computing operations of the application 108 are complete to a point such that further operation, recovery and/or rolling back of the application 108 may occur, based on the recorded data, without the loss of critical information or computing operations needed for operation of the application 108. This point of referential integrity is generally referred to herein as a known good state of the application 108.

In certain embodiments, the data agent 236 instructs the quiescing of the application 108 through an application programming interface (API). For instance, the data agent 236 may send a command (e.g., FLRSNAP.FOO) to the application 108 that causes the application 108 to quiesce. When the application 108 has placed itself in a known good state, the application 108 may send an acknowledgment to the data agent 236.

In certain embodiments, once the data management operations are suspended, the I/O buffers in the data path of the application are flushed (and/or the writes in the queues are flushed), and the source logs 244 are populated. For example, some or all of the pending data management operations (e.g., as of the time of the suspension of the application) may be allowed to complete and/or percolate through the data path. The filter driver 110 and/or data agent 236 then inserts a logical marker or tag in the source log file denoting that a "consistency point" or "consistency recovery point" has been reached. In some embodiments, the consistency point indicates the time at which the application 108 is at a known good state. For instance, in certain embodiments, the data agent 236 instructs the filter driver 110 to insert a consistency point entry into the source logs 244.

FIG. 4 illustrates consistency point entries as log entries 463 and 464 in, respectively, the first and second log files 460, 462. As shown, the consistency point entries are represented by "CRP" in the source logs 244. In certain embodiments, once the consistency point is identified and inserted into the source log 244, the data agent 236 may instruct the application 108 to "restart" so as to resume normal data management operations from the application 108 to the source storage device 112. In certain embodiments, the log entries are sequentially written to the source logs 244 until each consistency point.

Notwithstanding the foregoing, it will be understood that, in certain embodiments, although application 108 is quiesced, it need not actually pause or suspend operation during the quiescent period. Rather, the application 108 may continue to operate substantially normally but may queue internally, or otherwise buffer, data management operations intended for the source storage device 112. After the quiescent period, the buffered modification operations may be allowed to complete (i.e., be sent to the source storage device 112).

In certain embodiments of the invention, the application 108 is periodically quiesced (and a corresponding consistency point placed in the source log 244) based on particular criteria. For instance, the quiescing of the application 108 may be based on one or more system- or user-defined preferences (e.g., every five minutes). The periodic quiescing of the application 108 may be based on the desired frequency of performing replication, backup or other data modification operations on the subject data. For instance, applications 108 dealing with data-sensitive information may necessitate more frequent quiescing (and creation of consistency points) than other types of applications.

In yet other embodiments, policies for the frequency of consistency point entries may be automatically generated. For instance, the data agent 236 may be configured to quiesce the application 108 based on the status (e.g., capacity) of the source logs 244, the replication logs 352 and/or the destination storage device 116. In yet other embodiments, quiescing of the application 108 may be performed based on an automatic reporting procedure. For instance, a module of the replication system 400 may be configured to gather, receive and/or analyze information associated with a failure rate and/ or health of applicable servers. Additional details of such status monitoring are provided in U.S. patent application Ser. No. 11/120,619, filed May 2, 2005, now published as US 2006-0053261 A1, which is hereby incorporated herein by reference in its entirety. For example, the frequency of consistency points may be selected or adjusted to mitigate risks detected in a storage network. In certain embodiments, one or more management components of the replication system 400 may identify a storage-related characteristic and may modify the frequency of consistency points if the storage-related characteristic satisfies one or more particular risk criteria. For instance, risk criteria may be indicated by storage policies, storage definitions, a service level agreement ("SLA") or other information located in a management component database or other component of the replication system 400. In certain further embodiments, the frequency of consistency points may be based at least in part on a level of data protection or data availability in the replication system 400.

In certain embodiments, one or more log entries in the source logs 244 are preferably associated with time information, such as, for example, assigned a time stamp indicative of the client system time with which the particular log entries are associated. For instance, the time information may indicate the time at which: the log entry is written to the source log 244, the data management operation is generated by the application 108, the data modification operation is committed to disk or the like. In certain embodiments, not all the log entries are assigned a time stamp. Rather particular types of data, such as for example, consistency point markers and/or database commit entries, are assigned time stamps.

In certain embodiments of the invention, the data agent 236 coordinates with the replication agent 356 to copy log files from the source logs 244 to the replication logs 352. Such copying may be initiated based on any suitable factor, such as, for example, preset copying intervals, capacity thresholds reached in the source logs 244, time lapsed since the last copy operation, replication agent 356 requests for a copy operation, and/or based on specific parameters or requirements associated with a particular application 108. For instance, certain data-sensitive applications may be copied more frequently than other applications in order to reduce the amount of potential data loss due to a failure occurring between copy operations.

As further illustrated in FIG. 4, the replication logs 352 include a first log file 466 and a second log file 468. In certain embodiments, each of these log files 466, 468 corresponds, respectively, to the first log file 460 and the second log file 462 of the source logs 244. For instance, data may be transferred between the replication log(s) 352 and the source log(s) 244 such that the order in which the data was stored in the source log(s) 244 is preserved. In addition, the log files may be recreated in the replication log(s) 352 to reflect the organization of source logs 244. For example, the first log file 460 and the second log file 462 in the source logs 244 may be transferred and recreated by the replication agent 356 and/or the data agent 236. In other embodiments, however, data may be transferred and stored in a different order without preserving source system correlations and/or may be rearranged on or during transfer to or upon arrival in replication volumes 116A, 116B.

In yet other embodiments, the transferred data may retain the data structure used in the source logs 244 and/or may be changed, modified or rearranged to reflect, conform or otherwise interoperate with, the management particulars of the replication module 114. For example, certain referential indicators associated with the data may be modified or conformed to meet requirements of the replication agent 356. However, in preferred embodiments, referential integrity of the data is maintained between the source system 102 and the destination system 104.

The illustrated destination system 104 further comprises an optional preference database 470 in communication with the replication agent 356. In certain embodiments, the preference database 470 includes storage policies or other preferences usable by the replication agent 356 in managing data. For instance, the stored preferences may indicate the desired frequency at which the threads 358 should copy the data from the destination logs 352 to the replication volumes 116A, 116B. The preference database 470 may also store path information for detailing to which location(s) on the replication volume(s) 116A, 116B the data in the replication log(s) 352 should be copied. In yet other embodiments, the preference database 470 may include storage policies that dictate particular criteria for performing one or more data management operations on the replicated data.

With continued reference to FIG. 4, the replication module 114 further comprises one or more processes, such as a replication set or a log processing module 469 with a first thread 358A and a second thread 358B. In certain embodiments, as discussed above, the threads 358A, 358B are instantiated by the replication agent 356 to transfer data from the first and second replication logs 466, 468 to the first replication volume 116A and/or the second replication volume 116B.

In certain embodiments, the threads 358A, 358B process, scan and/or traverse the replication logs 352 and scan log entries therein to identify the data or files of concern to the particular thread. In certain embodiments, the threads 358A, 358B scan the log entries in a sequential manner (e.g., in the order in which the log entries were written to the log file).

When the thread encounters a log entry of interest, the thread copies the particular log entry from the replication logs 352 to the replication volumes 116A, 116B. For instance, the log entries may be copied in accordance with a path established based on the correlation or pairing information provided by the data agent 236 to the replication agent 356.

In certain embodiments, the threads 358A, 358B utilize time stamp or other temporal information that enables processing and/or replaying of modification operations. For example, based on time stamp information, the threads 358A, 358B may rearrange the replication data such that the data is stored on the one or more replication volumes in the proper order (e.g., the order in which the data was intended to be written to the source storage device 112). In such embodiments, the replicated data may be subsequently retrieved, recalled or otherwise accessed or processed and may be used to accurately restore the state of the application 108 as it existed at a given point in time. In yet other embodiments, other data management operations (e.g., searching, data classification) may be performed on the replicated data.

In certain embodiments, instantiated threads 358A, 358B may operate in parallel or sequentially to scan one or more replication logs 352 for log entries to copy for a certain application 108. Each thread, which may be responsible for replicating certain data of the application 108, may continue to scan the replication log 352 until encountering a consistency point. When such occurs, the thread may then notify the replication agent 356 that it has reached a consistency point and/or pause operation. When all active threads for a specific application 108 notify the replication agent 356 that a consistency point has been reached, the replication agent 356 may identify the data at that point in time as representing a known good state of the application 108. In certain embodiments, at this point, the replication agent 356 may suspend further copy operations by the threads 358A, 358B while the replicated data represents a known good state of the application 108. In yet other embodiments, the replication agent 356 may monitor the operation of the threads 358A, 358B without waiting for a notification from the threads.

Generally, the disclosed systems may handle files that may be needed to restore an application type (e.g., MICROSOFT EXCHANGE) if a data failure were to occur. This information gathering for the various files (e.g., control files, configuration files or the like) may preserve the referential integrity of one or more predefined application types operating within the storage operation system.

The replication system 400 of FIG. 4 provides several advantages for performing copying or other storage operations to data. For example, in certain embodiments, the replication system 400 may perform storage operations on the replicated data (e.g., data stored in the replication volumes 116A, 116B).

That is, creating replication copies allows the replication system 400 to access copies of production volume data without the significant use of client system 102 resources and/or interrupting or suspending data operations to the source storage device 112, thereby reducing the impact of data management operations on client applications. In addition, consistency point (known good state) information along with time stamp information may be advantageously used in performing storage operations to logically associate a time stamp of the copied data with the original time of the consistency point entry (e.g., the time at which the application 108 was in a known good state). Thus, even though the storage operation on the replicated data is performed at a later point in time (e.g., in relation to the client system time of the known good state of the application), the copied data resulting from the storage operation is associated with the original consistency point time (e.g., the client system time of the known good state of the application) Furthermore, this logical association of the client system time of the application's known good state may be repeated for subsequent copies of the data (e.g., a backup of the snapshot of the replicated data).

In certain embodiments, instructions for the storage operations are sent from the data agent 236 on the source system 102. For instance, the instructions may be included in the log file entries copied from the source system 102. In yet other embodiments, the storage operations are coordinated by the replication agent 356 (e.g., according to storage polices stored in the preference database 470) in combination with, or independent of, the data agent 236. In yet other embodiments, policies for storage operations may be stored in another system management component (e.g., a storage manager module).

Examples of certain storage operations performable on the replicated data in the destination storage device 116 will now be described. For example, a storage operation may include a basic copy of data from a first location to a second location.

Another form of a storage operation that may be performed on the replicated data is a backup operation. A backup operation generally includes copying data into a backup format as opposed to a native application format. For example, a backup copy may be stored in a backup format that facilitates compression and more efficient long-term storage. Backup copies generally have relatively long retention periods and may be stored on media with slower retrieval times than other types of secondary copies and media. In some cases, backup copies may be stored at an offsite location.

Another form of a storage operation that may be performed on the replicated data is a snapshot operation. In general, a snapshot records the state of a storage device, file system, or volume at a certain point in time. That is, the snapshot may be used to provide a point-in-time image of a live storage volume. In certain embodiments, the snapshot may be used for backing up data and/or, in the event of failure, to restore the storage device or volume to a previous known good state.

Snapshots may be implemented by several different methods. For example, in a "copy-on-write" method, a snapshot of a storage volume is created using a designated space, or snapshot volume, for the particular snapshot. During the initial creation of the snapshot, instead of copying the physical data, information is recorded about the location of original data in the storage volume (e.g., a logical copy of the data). For instance, metadata may be stored with respect to the original data and/or pointers may be used to identify the location of the original data. In certain embodiments, this initial snapshot may be performed when the storage volume is quiesced or in a "frozen" state.

Successive snapshots then track changes to the storage volume as the original data is modified. Before original data is modified, the original data is copied to a location in the designated snapshot storage. Thus, when a read request for an unmodified data block is made to the snapshot volume, the request is redirected to the original copy of the data. However, if a read request is made for a data block that has been modified, the request is directed to data in the specified snapshot storage. In embodiments wherein multiple snapshots are created and maintained concurrently, each snapshot may be designated or assigned a different storage space or snapshot volume.

In yet other embodiments, other types of snapshot technology may be used, such as, for example, direct-on-write, split mirror, copy-on-write with background copy, continuous data protection copies, combinations of the same or the like. For instance, in certain embodiments, a snapshot may not actually create another physical copy of all the data associated with an application, but may simply create pointers that are able to map files and directories to specific disk blocks.

In certain embodiments, a snapshot of the replication data is preferably performed at a consistency point. The snapshot then represents a set of recoverable application data up to the point in time associated with the consistency point (e.g., the time at which the quiesced application suspended normal data modification operations). Thus, a snapshot copy created from the replication data at a consistency point may also be consistent with the data stored in the primary volume or source storage device 112 at the time the consistency point was generated.

In certain embodiments, a snapshot is taken for each volume in which data is being replicated. For instance, with reference to FIG. 4, first thread 358A is writing to the first replication volume 116A, and second thread 358B is writing to the second replication volume 116B. In such embodiments, when the first and second threads 358A, 358B arrive at a consistency point log entry, a snapshot is taken of the replicated data in each replication volume 116A, 116B.

In certain preferred embodiments, when the snapshot is performed at a particular consistency point, the time of the snapshot is advantageously logically associated with the time that the consistency point was generated at the client system 102 (e.g., the client system time of the known good state of the application 108). For instance, the time stamp of the consistency point may be used to logically assign a "time" to the snapshot of the replicated data. In such a process, the snapshot of the replicated data then appears as if the snapshot was directly taken of the data in the source system 102 at the time of the consistency point. Such a process allows for the snapshot data to be viewed as a direct copy of the production volume data for a particular application (e.g., source storage device 112) at a certain point in time (e.g., the time of a known good state of an application).

For example, consider production volume data (e.g., source system data) that represents a known good state of the application 108 as of 3:00 P.M. To identify the known good state of the application, a consistency point marker having a time stamp of 3:00 PM is added to an appropriate log file. At 3:05 P.M., the production volume data along with the consistency point is replicated to a destination storage device 116. Thus, at this point in time, the destination storage device 116 is an exact copy of the production volume data of the application 108 as of 3:00 P.M.

A snapshot copy of the replicated data on the destination storage device is then performed at 3:10 P.M. During or after performing the snapshot operation, the snapshot is then logically associated with the 3:00 time stamp identified by the consistency point. As a result, the snapshot will have the same or substantially the same data as if the snapshot were directly taken from the source system data at the known good state of the pertinent application. Moreover, through logically associating the 3:00 P.M. time stamp with the snapshot data, the snapshot appears to have been directly taken from the source system data, even thought the snapshot was taken ten minutes later. However, because the source system data is not actually used to perform the snapshot operation, the source system resources are not impacted and may be free for client or other use.

In certain embodiments, logical associations of time with respect to the snapshot may be stored jointly with the snapshot and/or in a separate database. For instance, the logical time associations may be stored in an index on one or more replication volumes, on the replication module 114 (e.g., replication agent 356), in the preference database 470, in a storage manager database index, by the data agent 236, combinations of the same or the like. In certain embodiments, stored jointly with the "updated" time data may also be the actual location of the snapshot on the replication volumes 116A, 116B or other storage device(s).

As discussed above, the frequency of consistency points may vary and may depend on one or more system factors or user-selectable parameters. For instance, storage policies stored in one or more databases of the replication system 400 (e.g., the preference database 470) may dictate the frequency that consistency points are inserted (e.g., frequency of quiescing application) and/or the frequency at which snapshots are performed. In certain embodiments, a snapshot may be performed at each consistency point. In yet other embodiments, a snapshot may be performed at some other interval of consistency points (e.g., every five consistency points).

Once the snapshot is performed, one or more messages to system component(s) may be sent containing information relating to the time the snapshot was taken, the time stamp of the consistency point, the location of the snapshot, the location of the replication copy, the applicable time of the copy, combinations of the same or the like. For instance, such a completion message may be initially sent to the replication agent 356, which may further optionally notify the data agent 236 or other system management components with the information described above.

While certain embodiments of storage operations have been disclosed as being usable with the replication system 400 of FIG. 4, a wide variety of other storage operations may also be performed on the replication data and/or in conjunction with consistency point information. For example, other copies of the replicated data may be performed, such as, but not limited to, creation, storage, retrieval, migration, deletion, auxiliary copies, incremental copies, differential copies, Hierarchical Storage Management ("HSM") copies, archive copies, Information Lifecycle Management ("ILM") copies, other types of copies and versions of electronic data or the like.

For instance, an HSM copy is generally a copy of the primary copy data, but typically includes only a subset of the primary copy data that meets a certain criteria and is usually stored in a format other than the native application format. For example, an HSM copy may include only that data from the primary copy that is larger than a given size threshold or that is older than a given age threshold and may be stored in a backup format. Often, HSM data (e.g., e-mail messages) is removed from the primary copy, and a stub is stored in the primary copy to indicate its new location. When a user requests access to the HSM data that has been removed or migrated, systems use the stub to locate the data and often make recovery of the data appear transparent even though the HSM data may be stored at a location different from the remaining primary copy data.

In yet other embodiments, the replication system 400 may use the replication data to create a shadow version of the data on the source storage device 112 of the client system 102. In such embodiments, if there is a failure and/or overload of the source storage device 112, the system 102 may repoint to the shadowed version.

In yet other embodiments, different types of data management operations may be performed on the replication data depending on one or more schedule policies. For example, a snapshot storage operation may be scheduled to be performed at consistency point entries every five minutes, while a differential backup may be performed on the replication data every hour. Furthermore, a full backup may be scheduled to be performed once a day. Such scheduling policies may be advantageously determined to satisfy the needs of the user while reducing the impact on system resources.

In certain embodiments, after appropriate storage operations are performed on the replicated data, a message may be sent to other system management components (e.g., a snapshot manager and/or optional storage manager) indicating that the replication process is complete up to the time stamp associated with consistency point. At this point, the replication agent 356 may instruct copy operations associated with the threads 358A, 358B to resume.

Figure 5:
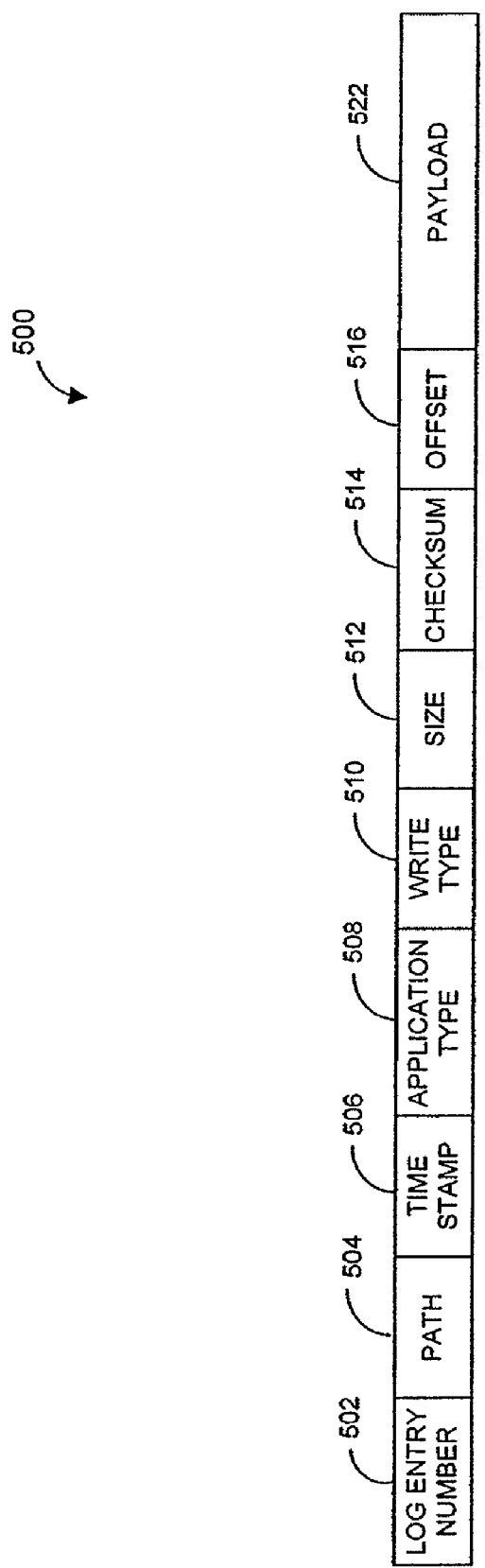
FIG. 5 illustrates various fields of an exemplary embodiment of a log entry usable by the replication systems of FIGS. 1 and 4.

FIG. 5 illustrates an exemplary embodiment of a data structure of a log entry 500 usable with the replication systems described herein. In certain embodiments, the log entry 500 comprises information regarding modifications to data and/or files on the source storage device 112 and may include, for example, information regarding: which file was modified, the time of the modification, the type of modification, the relative data, a unique identification, combinations of the same or the like. For exemplary purposes, the various fields of the log entry 500 will be described with respect to a data write operation in the replication system 400 of FIG. 4.

In certain embodiments, the log entry 500 is initially generated by the filter driver 110 and is stored in the source log 244. For example, the log entry 500 may comprise a data word having a plurality of fields. As illustrated, the log entry 500 comprises a log entry number field 502, a path field 504, a time stamp field 506, an application type field 508, a write type field 510, a size field 512, a checksum field 514, an offset field 516 and a payload field 522.

The log entry number field 502 may include information regarding the entry number assigned to the log entry 500 for system management purposes such that entries may be tracked and reordered relative to one another if necessary. For example, as mentioned herein, log entries may be arranged in a temporally sequential manner based on the application write operation with which the particular log entry 500 is associated. In certain embodiments, log entry numbers or other information may be recycled over time once all the numbers in a particular range have been used. In yet other embodiments, the log entry number field 502 may be configured to store other types of identification data for labeling the log entry 500.

The path field 504 may include information regarding the file path on the source storage device 112 with which the data write operation was associated. For example, a path of "C:\DIR\USER\" may indicate that the log entry corresponds to an operation writing data to a folder or file on the source storage device having the designated pathname. In certain embodiments, the path field 504 may include an absolute file pathname. In other embodiments, the path field 504 may include an abbreviated pathname and/or an inode (e.g., for UNIX-based systems).

Moreover, the path field 504 may include information relating to the log entry's replication volume destination, and thus may be useful in establishing or confirming correlation or pairing information used by the thread(s) 358A, 358B. For instance, in certain embodiments, the file path of a particular log file may be hard-coded to one or more particular replication volume(s).

The time stamp field 506 may include information relating to the time when the subject data write occurred. In certain embodiments, the time stamp is advantageously associated with the time of the client computer 230 on which the application 108 is executing. For instance, the filter driver 110 may access the source system time when generating the log entry 500. In other embodiments, the time stamp may be provided by the filter driver 110 and/or may be relative to the replication system time.

The application type field 508 may include information identifying the application type with which the log entry 500 is associated (e.g., MICROSOFT OUTLOOK data, MICROSOFT SHAREPOINT data, ORACLE data, SQL data, MICROSOFT WORD data, MICROSOFT INTERNET EXPLORER data or the like).

The write type field 510 may include information regarding the category of write data involved with the log entry 500. For instance, the write type may identify if the log entry 500 is associated with a database modification, a log write, a database commit command, a consistency point or the like. In certain embodiments, the information in the write type field 510 is used to implement parallelism between multiple threads when performing data replication. For instance, a first thread (e.g., thread 358A) may handle log write commands, and a second thread (e.g., thread 358B) may handle commit database commands. In certain embodiments, the data stored in the write type field 510 may be used for prioritizing the processing of various log entries (e.g., processing by the threads 358).

The size field 512 may include information relating to the size (e.g., the number of bytes) of the data being modified by the data write operation. In yet other embodiments, the size field 512 may contain information relating to the size of other or additional segments within the log entry 500, such as, for example, the size of the payload field 522.

The checksum field 514 may include information relating to error checking to ensure, for example, that the log entry 500, when created and subsequently transmitted, contains the expected number of bits and has not been corrupted or otherwise impermissibly changed. For instance, the checksum field 514 may store data representing the arithmetic sum of some or all of the fields in the log entry 500.

The offset field 516 may include information relating to the location within a file or portion of data that the data write is occurring. For instance, if the subject data write operation is associated with modifying the twentieth through the thirtieth bytes of a file or piece of data fifty bytes long, the offset field 516 may store a value of twenty. In such embodiments, the information in the offset field 516 may be used jointly with the information in the size field 512 to identify the entire portion of a file being modified. For instance, in the above example the size field 512 may store a value of eleven to indicate the length of the modified section (i.e., twentieth through thirtieth bytes).

The payload field 522 may include information relating to the data written from the application 108 to the source storage device 112. This information generally represents the application data captured by the filter driver 110 for replication and may include additional information for the ongoing operation or reconstitution of the application 108.

It will be understood that the illustrative filter driver log entry 500 shown in FIG. 5 merely represents one possible embodiment of a log entry suitable for use with embodiments of the invention and that other embodiments may be used if desired. For example, in other embodiments, the log entry 500 may comprise more or fewer fields to accommodate the requirements of the particular replication or storage operation system involved and/or to achieve certain data or management goals, such as conserving memory, increasing processing speed and increasing the amount of information in each log entry. For instance, in certain embodiments wherein the path determination for a particular log file or log entry is dynamic, the log entry 500 may not include the path field 504.

In other embodiments, the log entry 500 may include a priority field that may be used for prioritizing replication and/or data management operations of data associated with the log entry 500.

In other embodiments, the log entry 500 may concern a file attribute change rather than a data write operation. In such embodiments, the write type field 510 may identify the log entry 500 as being associated with a file attribute change. Furthermore, the log entry 500 may store information regarding the new file attribute but would not require offset or size values to be stored in the size field 512 and/or the offset field 516.

Figure 6:
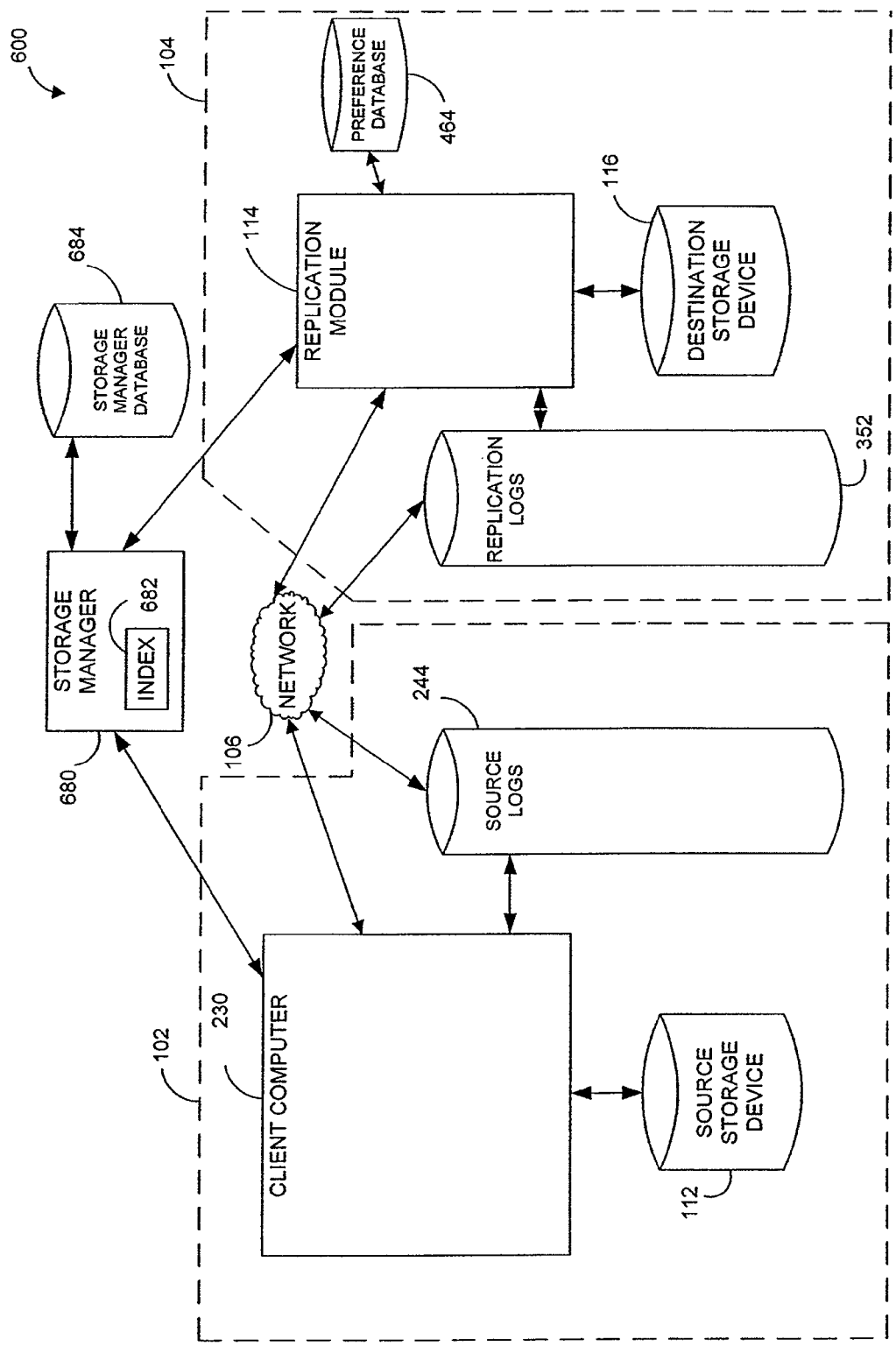
FIG. 6 illustrates a block diagram of an exemplary embodiment of the replication system of FIG. 1 having a storage manager module.

FIG. 6 illustrates another embodiment of a replication system 600 similar to the replication system 400 of FIG. 4. As shown, the replication system 600 further includes a storage manager 680 that communicates with the source system 102 and the replication system 104. In certain embodiments, the storage manager 680 is a software module or application that is configured to direct the performance of one or more storage operations and, in particular, the replication of data from the source system 102 to the replication system 104. In further embodiments, the storage manager 680 may perform one or more of the operations or functions described above with respect to the data agent 236 and/or the replication agent 356. For instance, the storage manager 680 may direct and/or coordinate the performance of one or more storage operations on the replicated data (e.g., snapshots of the replicated data).

In certain embodiments, the storage manager 680 maintains an index 682, such as a cache, for storing information relating to: logical relationships and associations between components of the replication system 600, user preferences, management tasks, and/or other useful data. For example, the storage manager 680 may use its index 682 to track the location and timestamps of one or more snapshots of the replicated data. In certain embodiments, the storage manager 680 may track logical associations between one or more media agents (not shown) and/or storage devices.

The storage manager 680 may also use its index 682 to track the status of data management operations to be performed, storage patterns associated with the system components such as media use, storage growth, network bandwidth, Service Level Agreement ("SLA") compliance levels, data protection levels, storage policy information, storage criteria associated with user preferences, retention criteria, storage operation preferences, and other storage-related information. The index 682 may typically reside on the storage manager's hard disk and/or other database.

As shown in FIG. 6, the storage manager 680 further communicates with a database 684. In certain embodiments, the storage manager database 684 comprises a memory for storing system management information relating to the replication of data. For instance, the database 684 may be configured to store storage and/or restore policies, user preferences, the status or location of system components or data, combinations of the same and the like. In yet other embodiments, the database 684 may be configured to store information described above with respect to the index 682. In yet other embodiments, at least a portion of the index 682 may be stored on the database 684.

In other embodiments, the storage manager 680 may alert the user or system when a particular resource of the replication system 600 is unavailable or congested or when components are unavailable due to hardware failure, software problems, or other reasons. In certain embodiments, the storage manager 680 may utilize replication system 600 data to suggest solutions to such problems when they occur or even before they occur. For example, the storage manager 680 might alert the user that a storage device in the replication system 600 was full or otherwise congested, and then suggest, based on job and data storage information contained in its index cache, an alternate storage device. In yet further embodiments, the storage manager 680 or other system component may take action to remedy the problem at issue. For example, the storage manager 680 may perform load balancing, error correction, or the like, based on information received regarding the replication system 600.

In certain embodiments, the storage manager 680 may include other components and/or modules. For example, the storage manager 680 may include a jobs agent module (not shown) that monitors the status of storage operations that have been performed, that are being performed, or that are scheduled to be performed in the replication system 600.

Moreover, the storage manager 680 may include an interface agent module (not shown). In certain embodiments, the interface agent module may provide presentation logic, such as a graphical user interface ("GUI"), an application program interface ("API"), or other interface by which users and system processes may be able to retrieve information about the status of storage operations and issue instructions to the replication system 600 regarding the performance of storage operations. For example, a user may modify the schedule of a number of pending snapshot copies or other types of copies. As another example, a user may use the GUI to view the status of all storage operations currently pending in the replication system 600 or the status of particular components in the replication system 600.

Additional details of storage manager modules useful with embodiments of the replication systems described herein are described in U.S. patent application Ser. No. 09/354,063, filed Jul. 15, 1999, which is hereby incorporated herein by reference in its entirety.

Figure 7:
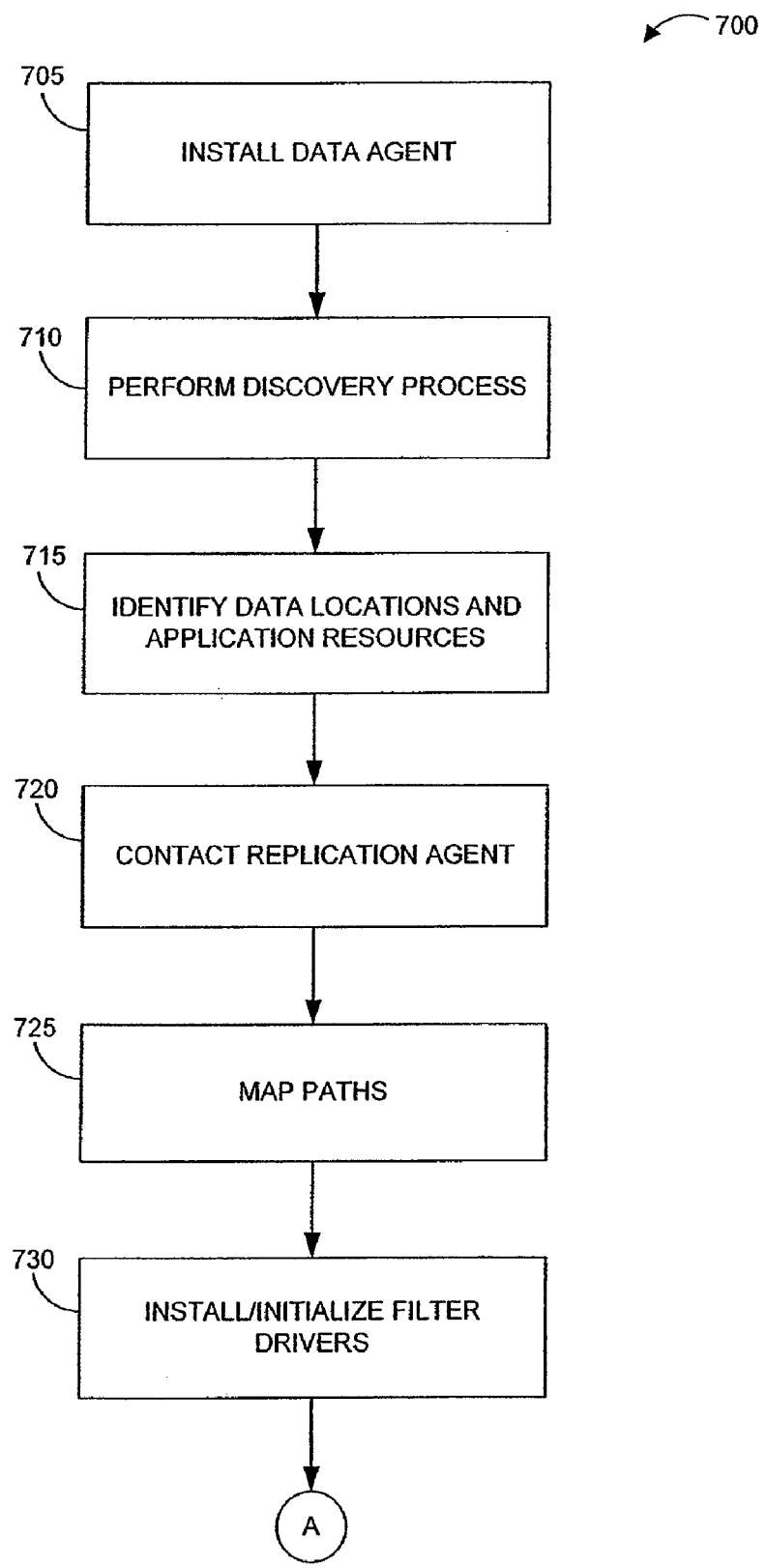
FIG. 7 illustrates a flow chart of an exemplary embodiment of an installation process usable by the replication system of FIG. 4.

FIG. 7 illustrates a simplified flowchart of an initialization process 700 in accordance with certain embodiments of the invention. In particular, the initialization process 700 concerns certain preliminary processes and acts for setting up a system for performing data replication, as disclosed herein. For exemplary purposes, the initialization process 700 will be described hereinafter with reference to the components of the replication system 400 of FIG. 4.

The initialization process 700 begins with Block 705, wherein one or more data agent(s) 236 are installed on the client computer 230. In certain embodiments, the data agent 236 may be installed remotely from other portions of the replication system 400 based on a particular need or to conform to certain directives or resident storage policies. In other embodiments, the data agent 236 may be installed locally by a system user as desired. For instance, installation of the data agent 236 may include deployment and installation of object code files and supporting software.

In certain embodiments, the data agent 236 may be installed for each application 108 of interest, or one or more data agents 236 may be installed for a larger number of applications 108. Furthermore, in certain embodiments, an installation guide such as a wizard or other program may recommend the appropriate number and type of data agents 236 to install (which may be performed substantially automatically based on application and system configuration information).

At Block 710, the installed data agents 236 may perform certain auto-discovery routines in order to determine basic system and application information. In some embodiments, the auto-discovery routines may be considered part of the installation process. For example, the data agent 236 may begin the auto-discovery process by scanning and evaluating the folder and directory structure of the client computer 230 to determine which folders are used by a particular application 108. In certain embodiments, such information allows the data agent 236 to identify and locate files or other information necessary to replicate the current operating state of the application 108 of interest.

In certain embodiments, the scanning and evaluation process may involve scanning multiple physical and/or logical volumes associated with the source storage device 112 and/or within a given network or enterprise to locate the data and system configuration information necessary for data replication.

After the appropriate resources have been discovered and examined, the data agent 236 may identify, arrange, coordinate and/or queue the necessary data within various locations or instances of the application 108 to establish a platform for proper data replication (Block 715). In certain embodiments, this process may be a precursor for performing the initial seeding operation described above.

Next, at Block 720, the data agent 236 communicates with the replication agent 356. For instance, the data agent 236 may transmit to the replication agent 356 information regarding the replication of data. The data agent 236 may also request information from the replication agent 356 and/or other network management components for any information that may bear on, or be related to, the correlation or mapping of network storage paths for replication data. For example, the data agent 236 may consult the preference database 470 of the destination system 104, the preference database 465 of the source system 102 and/or a storage manager component, for correlation or pairing information. Based on this information, data paths may be identified for use by threads 358 when copying data from the replication logs 352 to the replication volumes 116A, 116B. In certain embodiments, one or more data paths may be dynamically coded or determined, such as, for example, based on one or more storage policies and/or preferences.

At Block 730, the initialization process 700 includes installing and initializing the filter drivers 110. In certain embodiments, such installation and/or initialization is based at least in part on information obtained by the data agent 236 during the discovery process (Block 710). For example, in certain embodiments, one or more filter drivers 110 may be installed by the data agent 236 in the I/O path of the application(s) 108.

Figure 8:
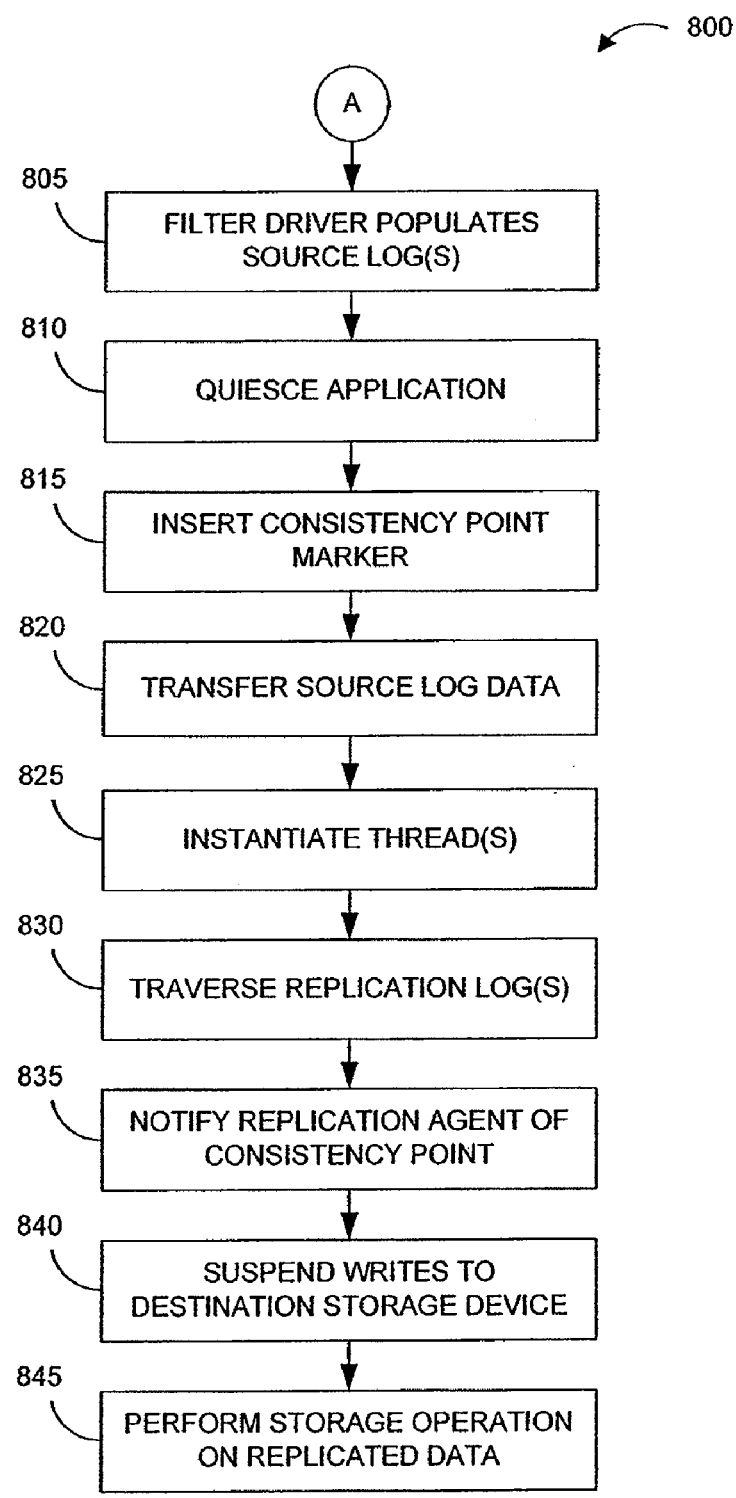
FIG. 8 illustrates a flow chart of an exemplary embodiment of a replication process usable by the replication system of FIG. 4.

FIG. 8 illustrates a simplified flowchart of a replication process 800 in accordance with certain embodiments of the invention. In particular, the replication process 800 involves the copying of data from a source system to a destination system. Furthermore, in certain embodiments, the replication process 800 is configured to be performed after completion of the initialization process 700 of FIG. 7. For exemplary purposes, the replication process 800 will be described hereinafter with reference to the components of the replication system 400 of FIG. 4.

The replication process 800 begins with Block 805, wherein the filter driver 110 populates the source log(s) 244 with data associated with the application 108, such as data identified by the data agent 236. As discussed in more detail above, such data may relate to data or file modification operations being passed from the application 108 to the source storage device 112. In certain embodiments, the filter driver 110 populates the source logs 244 in a temporally sequential manner such that operations and data are recorded in time descending (or ascending) order (e.g., first operation at the top and last operation at the bottom).

In certain embodiments, the data is populated in the source logs 244 in a format similar to the structure of the log entry 500 of FIG. 5. In other embodiments, the data may be populated in other suitable formats to satisfy the requirements of the particular replication system. For instance, the log file format may comprise a two- or multi-column structure, wherein the information in a first column may indicate the type of data operation performed, and the log entry's position in the log file indicates the order of the operation relative to other operations in the log file. The information in a second column may indicate the payload data associated with the data operation indicated by the first column.

After or concurrently with Block 805, the data agent 236 or other system component pauses or quiesces the application 108 (Block 810). As discussed above, such quiescing causes the application 108 to temporarily suspend data modification operations to the source storage device 112 once the application 108 reaches a known good state.

Once new modification operations are suspended and the associated source log 244 is populated based on the modification operations up to the known good state, the data agent 236 or other replication system component inserts a logical marker or tag in the source log 244 (Block 815). This "consistency point" denotes that the state of the data is such that the application 108 may be recovered or that further stable operation from that point going forward is ensured. Once the consistency point is identified and established, the data agent 236 may restart the application 108 such that data modification operations from the application 108 to the source storage device 112 resume.

As referenced by Block 820, the data agent 236 or other system management component coordinates the transfer of the data in the source logs 244. In certain embodiments, the data agent 236 coordinates with the replication agent 356 to copy data from the source logs 244 to the replication log(s) 352. For instance, the replication agent 356 and/or data agent 236 may open a network path or a communication socket between the source log(s) 244 and the replication log(s) 352. The log entries of the source log(s) 244 may then be transferred as described above to populate the replication log(s) 352. In certain embodiments, as the replication log 352 is populated, the replication agent 356 may also obtain configuration information from the data agent 236 or other system management component such as, for example, a storage manager. Such configuration information may identify aspects of the set of information being transferred as well as identify pairing information that correlates certain types of replication data with certain replication volumes or other storage destinations.

At Block 825, the replication process 800 includes instantiating one or more threads 358 to begin the transfer of data from the replication log(s) 352 to certain replication volumes 116A, 116B. In certain embodiments, the replication agent 356 is configured to instantiate one or more of the threads 358A, 358B. In certain embodiments, the threads 358 are instantiated and/or particularized based on pairing or correlation information received from a management component and/or based on certain system configuration information (e.g., available replication volumes), data path information, the type of information in the transferred data set, combinations of the same and the like. For example, the replication agent 356 may instantiate one or more threads 358 that correlate certain data types with certain data volumes and may specify primary and alternate data paths.

Once instantiated, the threads 358 process and/or traverse the replication log(s) 352 until a consistency point is encountered (Block 830). In certain embodiments, when reaching a consistency point, the thread 358 stops scanning the replication log 352 and notifies the replication agent 356 that the thread 358 has reached the consistency point (Block 835).

In certain embodiments, once all active threads 358 associated with traversing the replication logs 352 have notified the replication agent 356 that a consistency point has been reached, the replication process 800 moves to Block 840. At this point, the replicated data stored in the replication volumes 116A, 116B preferably represents a known good state of the application 108.

At Block 840, the replication agent 356 suspends further operation by the threads 358. For instance, the replication agent 356 may suspend data writes to the destination volumes 116A, 116B. At this point, the replication process 800 proceeds with Block 845, wherein one or more storage operations (e.g., snapshots) may be performed on the replicated data, which are described in more detail above.

Figure 9:
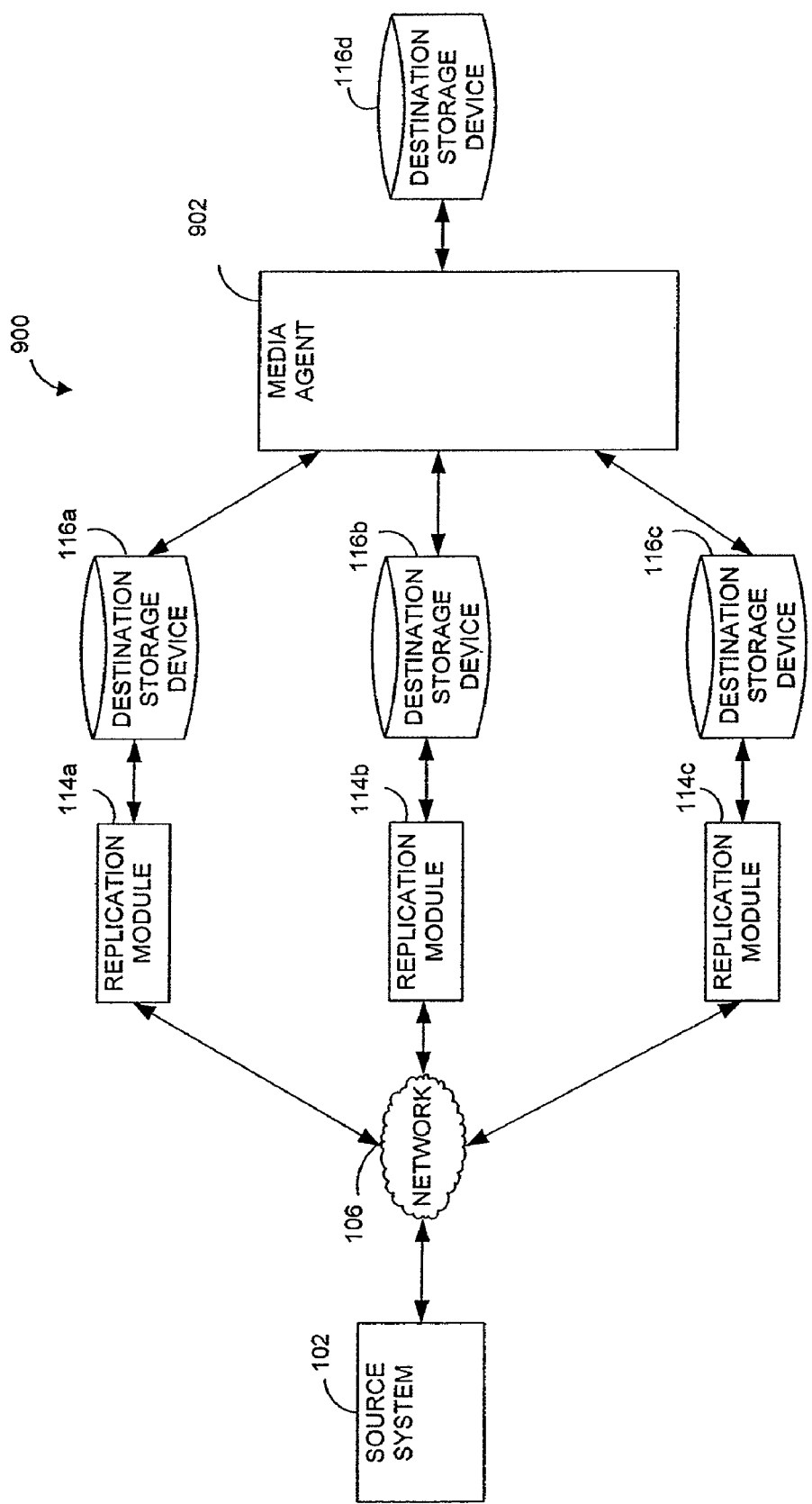
FIG. 9 illustrates a block diagram of another embodiment of a replication system having multiple replication modules and destination storage devices.

FIG. 9 depicts a block diagram of another embodiment of a replication system 900, which has multiple replication modules. In certain embodiments the replication system 900 advantageously provides load balancing options between the replication modules and/or the parallel processing of replication data.

As shown, the replication system 900 comprises the source system 102 that communicates through the network 106 with a plurality of replication modules 114*a*, 114*b* and 114*c*. For simplicity, the various sub-components of the source system 102 and the replication modules 114*a*-114*c* will not be described in detail, and it will be understood that such sub-components, and the functions thereof, may be similar to those described with respect to FIGS. 1-4.

In certain embodiments, each of the replication modules 114*a*-114*c* is configured to receive a portion of replication data from the source system 102. For example, one or more data agents of the source system 102 may communicate with replication agents of the replication modules 114*a*-114*c* to coordinate the transfer data from source logs to replication logs. In certain embodiments, one data agent may communicate with one or more replication modules, or multiple data agents may communicate with the same replication module.

For instance, in certain embodiments, each replication module may be configured to receive a particular type of application data from the source system 102. As an example, replication module 114*a* may be configured to receive replication data related to MICROSOFT EXCHANGE, while replication modules 114*b*, 114*c* are configured to receive replication data relating to, respectively, SHAREPOINT and SQL data. In yet other embodiments, each replication module may handle different types of data from the same application.

In other embodiments, the replication data may be sent to each of the replication modules 114*a*-114*c* based at least in part on the working load of the replication modules 114*a*-114*c*. In such embodiments, the replication system 900 may further comprise a storage manager or other system component (not shown) that may monitor the state of each of the replication modules 114*a*-114*c*. In yet other embodiments, the replication modules 114*a*-114*c* may communicate a status report to the data agent(s) of the source system 102. When one of the replication modules 114*a*-114*c* has an unbalanced load compared to the other replication modules, the replication data from the source system 102 may be re-routed or directed to one or more of the other replication modules.

It will also be understood that, in certain embodiments, the replication modules 114*a*-114*c* may also communicate with each other either directly or through the network 106. For example, the replication modules 114*a*-114*c* may share with each other information regarding: storage policies, storage location information, processing loads, storage capacities, combinations of the same or the like.

As further depicted in FIG. 9, each of the replication modules 114*a*-114*c* is associated with a destination storage device, the functionality and structure of which is described in more detail above. In certain embodiments, each of the destination storage devices 116*a*-116*c* is a separate device. For instance, one or more of the destination storage devices 114*a*-114*c* may be remotely located with respect to the other destination storage devices. In yet other embodiments, one or more of the destination storage devices 114*a*-114*c* may reside on the same physical medium, such as separate volumes on the same physical media.

In certain embodiments, the replication system 900 further comprises a second tier having one or more destination storage devices 116*d* that are used to store copy data generated from storage operations performed on the replication data stored in the destination storage devices 116*a*-116*c*. For instance, as shown, in communication with the destination storage devices 116*a*-116*c* is a media agent 902. In certain embodiments, the media agent 902 comprises a module (software and/or hardware) that conducts, copies or otherwise moves data between the destination storage devices 116*a*-116*c* and the destination storage device 116*d*. The media agent 902 may generally communicate with the destination storage devices 116*a*-116*d* via a local bus, such as a SCSI adaptor. In other embodiments, the destination storage devices 116*a*-116*d* may be communicatively coupled to the media agent 902 via a SAN and/or a NAS.

In certain embodiments, the media agent 902 may maintain an index cache that stores data generated by the replication system 900 during storage operations. Such data may include, for example, information regarding the location of the stored data on the destination storage devices 116*a*-116*d*, information regarding the content of the data stored, such as file names, sizes, creation dates, formats, application types, and other file-related criteria, information regarding the client system 102 and/or the replication modules 114*a*-114*c*.

In certain embodiments, the media agent 902 and/or a storage manager may store information regarding one or more storage policies, storage criteria, or storage preferences associated with the stored replicated data. For example, in certain embodiments, the media agent 902 is configured to obtain partial snapshots of data from multiple destination storage devices 116*a*-116*c* and merge the partial snapshots into a single snapshot of data for storage on the destination storage device 116*d*.

For instance, in certain embodiments, the media agent 902 may obtain partial snapshots that are logically associated with the same time stamp. That is, partial snapshots of replication data that are generated with respect to the same consistency point may be forwarded to the media agent 902 and constructed into a single snapshot of the data. Because the time stamp logically associated with the merged snapshot refers to a known good state of the application at the time a consistency point was generated at the client system, it does not matter the time(s) at which the partial snapshots of the replicated data were actually taken and/or merged. Thus, the media agent 902 may be capable of merging snapshots that were taken at different times but that refer to the same known good state of the application.

Furthermore, in certain embodiments, the media agent 902 or other system component may logically associate the newly merged snapshot with the timestamp of the relevant consistency point. Thus, multiple storage operations may be repeatedly performed on the replication data without losing referential integrity with the production volume data stored on the client system.

While performing data copies, computer networks are sometimes faced with network errors and/or rebooting. For instance, a network connection may be lost between two sites and/or transmitted data may be corrupted. In view of the foregoing, it would be advantageous to have a replication system that further includes a process for verifying that log entries are received and/or properly processed or replayed once on the destination machine(s).

Figure 10:
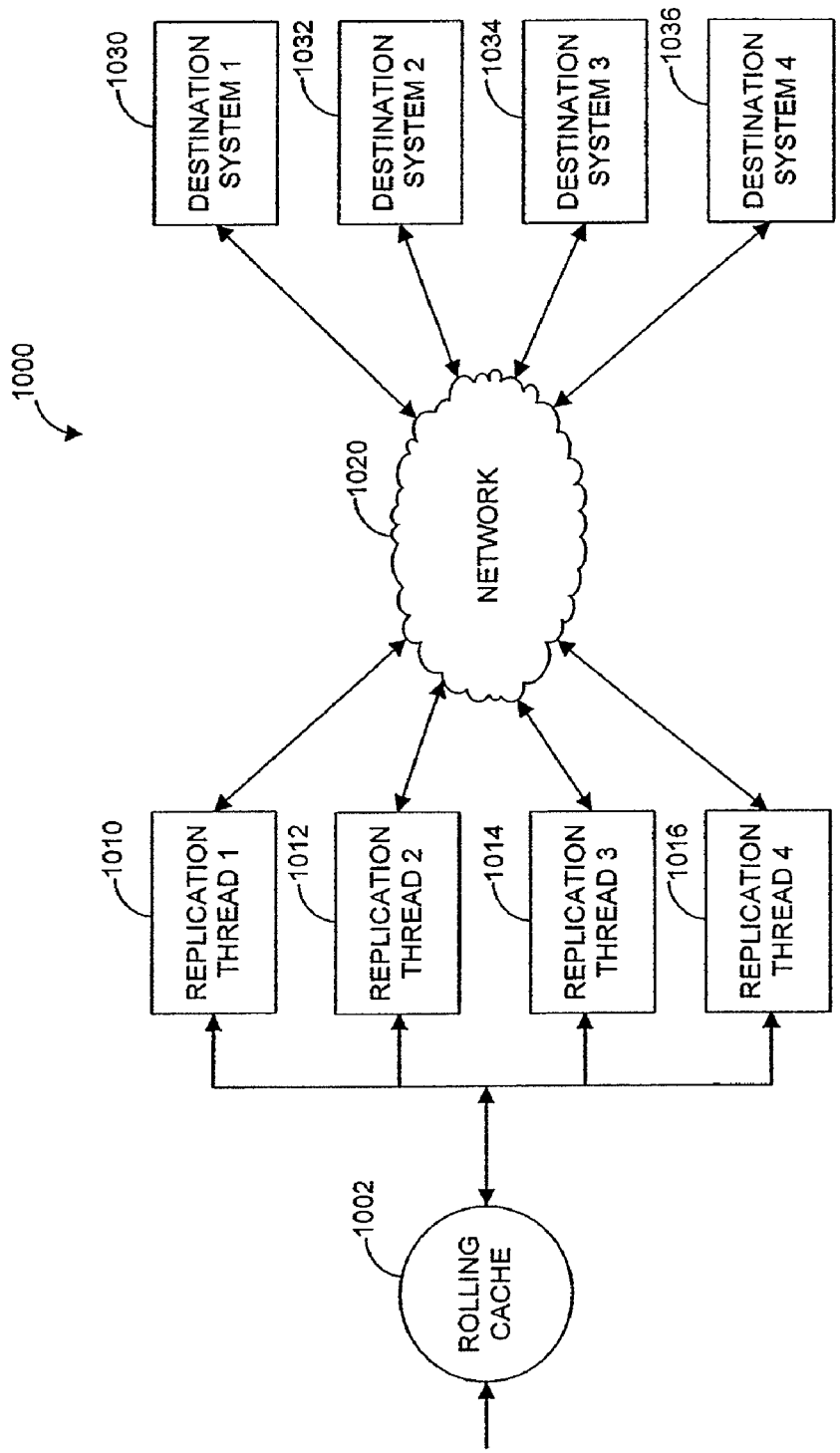
FIG. 10 illustrates a block diagram of an exemplary embodiment of a rolling cache configuration usable with embodiments of a replication system.

FIG. 10 illustrates an embodiment of a rolling cache configuration 1000 that provides for the tracking of the last successfully applied record on the destination machine(s), preserving not-yet-transferred records even across reboots, and/or switching back to an initial synchronization mode if too much time has passed during a network failure. For instance, in certain embodiments, the rolling cache configuration 1000 performs caching of log entries in the application layer once the log entries have been received from a filter driver.

In certain embodiments, the rolling cache configuration 1000 maintains a rolling cache 1002 of log entries on a source system and keeps track of the last successfully applied sequence number on each of the destinations. In general, the rolling cache 1002 stores log entries generated by the source system, which log entries are subsequently retrieved by one or more replication threads (or processes). In a UNIX-based environment, the log entries in the rolling cache 1002 have preferably been assigned a destination file pathname (such as through pathname translation), which is described in more detail below with respect to FIGS. 11-13.

In certain embodiments, the rolling cache 1002 comprises a permanent disk cache whose storage that is not affected by system reboots or the like. In certain embodiments, the rolling cache 1002 is configured to maintain its storage space by performing in a first-in first-out fashion. In particular, when new log entries are added to the rolling cache 1002, the oldest log entries are deleted. Such embodiments advantageously reduce fragmentation and the need for disk cleanups of the rolling cache 1002.

In certain embodiments, the size of the rolling cache 1002 is selectable by a user. For instance, the user may input through a user interface the amount of memory on a disk to be allocated for the rolling cache 1002. In other embodiments, the size of the rolling cache 1002 is fixed and/or predetermined. For example, in certain embodiments, the rolling cache 1002 maintains a log entry history of between approximately five gigabytes and approximately twenty gigabytes. In other embodiments, the rolling cache 1002 has a smaller size or a larger size to meet the needs of the particular replication system (e.g., depending on the size of individual log entries).

As depicted in FIG. 10, the rolling cache 1002 further communicates with a plurality of replication threads: a first replication thread 1010, a second replication thread 1012, a third replication thread 1014 and a fourth replication thread 1016. In certain embodiments, each of the replication threads 1010, 1012, 1014, 1016 communicates through a network 1020 with one or more destination systems. For example, the first replication thread 1010 may communicate with a first destination system 1030, the second replication thread 1012 may communicate with a second destination system 1032, the third replication thread 1014 may communicate with a third destination system 1034, and the fourth replication thread 1016 may communicate with a fourth destination system 1060. In other embodiments, multiple replication threads may communicate with a single destination system, and/or a single replication thread may communicate with multiple destination systems.

In certain embodiments, the replication threads 1010, 1012, 1014, 1016 obtain log entries from the rolling cache 1002 and forward the entries to the appropriate destination system(s) for data replication. Because a history of the log entries is preferably stored in the rolling cache 1002, the replication threads 1010, 1012, 1014, 1016 do not need to store copies of the transmitted log entries, even if the particular destination system happens to be offline. In other embodiments, the replication threads 1010, 1012, 1014, 1016 monitor which log entries have been successfully replayed on the destination system(s).

For instance, in certain embodiments, each of the log entries comprises a unique identification, such as, for example, a sequence number. When a particular log entry is replayed on a destination system, the subject destination system records the sequence number of the most recently stored log entry. In certain embodiments, when one of the replication threads establishes, or reestablishes, a network connection with one of the destination systems 1030, 1032, 1034, 1036 (e.g., after a network glitch or reboot), the replication thread requests from the destination system the sequence number of the most recently (and successfully) replayed log entry. The replication thread then uses the sequence number to retrieve the next log entry from the rolling cache 1002, and the replication process resumes from where the process was previously suspended or aborted. In circumstances when too much time has passed since the network failure, and the rolling cache 1002 has deleted the log entries at issue (e.g., "rolled over"), then the replication system may fall back to an initial mirroring in order to resume normal operation.

In other embodiments, the destination system(s) send the sequence number of the most recently replayed log entry to the particular destination thread that transmitted the log entry. In other embodiments, the replication system may store the sequence number of the most recently played log entry. In yet other embodiments, the replication system may notify all the replication threads 1010, 1012, 1014, 1016 and/or other destination systems that a particular log entry has been successfully replayed.

In certain embodiments, because the rolling cache 1002 provides a substantial history of all logged changes, the replication system is capable of recovering from network glitches or destination machine reboots without having to resynchronize the entire system. That is, the replication thread(s) are able to find the appropriate log entry (e.g., the log entry following the latest successfully replayed log entry) in the rolling cache 1002 and resume replication traffic to the destination system.

Embodiments of the rolling cache configuration 1000 of FIG. 10 may provide several advantages. For example, in certain embodiments, the replication systems 1030, 1032, 1034, 1036 do not need to send acknowledgments to the replication thread(s) that a particular log entry has been received by the replication system(s). In such embodiments, the replication threads 1010, 1012, 1014, 1016 are configured to stream or transmit log entries to the destination systems without waiting for a response, thus resulting in a more rapid transmission of data. Furthermore, components of the source system need not store information regarding which log entries have been replayed.

Although the rolling cache configuration 1000 of FIG. 10 illustrates a plurality of replication threads 1010, 1012, 1014, 1016 and destination systems 1030, 1032, 1034, 1036, in other embodiments, the rolling cache configuration 1000 may comprise more or fewer replication threads and/or destination systems. Furthermore, in certain embodiments of the invention, the rolling cache configuration 100 may comprise more replication threads than destination systems or more destination systems than replication threads.

As discussed above, one of the advantages of the embodiments of the data replication systems disclosed herein is that such systems are capable of translating information intercepted by a filter driver on a first (source) system into information that is suitable for replay (e.g., replication) on a second (destination) system. In certain embodiments, however, the identification of files or directories in the source system may not be suitable for use with the directory structure of the destination system.

For example, in UNIX-based systems, such as SOLARIS and LINUX, file system operations are generally identified as operations on "inodes" (or "vnodes") such that files are referenced by a unique inode number and/or by a combination of one or more directory inode numbers and a short name. Such systems often utilize pathname translation algorithms to implement a user-level hierarchical view of the file system.

Such usage of inodes and short names, however, is not conducive for replaying data modification operations on a second system, such as occurs in the data replication systems disclosed herein. That is, a path having one or more inodes and/or short names does not provide a destination system with the appropriate information for performing the replicated data modification operation.

Certain operating systems (e.g., SOLARIS 10, LINUX 2.6) perform pathname translation within the operating system kernel by generally traversing backwards a directory name lookup cache (DNLC). Using such translation systems in the data replication environment, however, may yield concurrency issues if certain locking processes are not performed. For instance, in order to ensure that other threads or processes do not rename one of the components of a file's absolute path between the time that the thread computes the absolute path and the time that a relevant log entry is emitted, the DNLC would need to be locked against updates from other threads during that period of time. Having this central lock on the DNLC, however, may impose severe performance penalties on the entire operating system.

Figure 11:
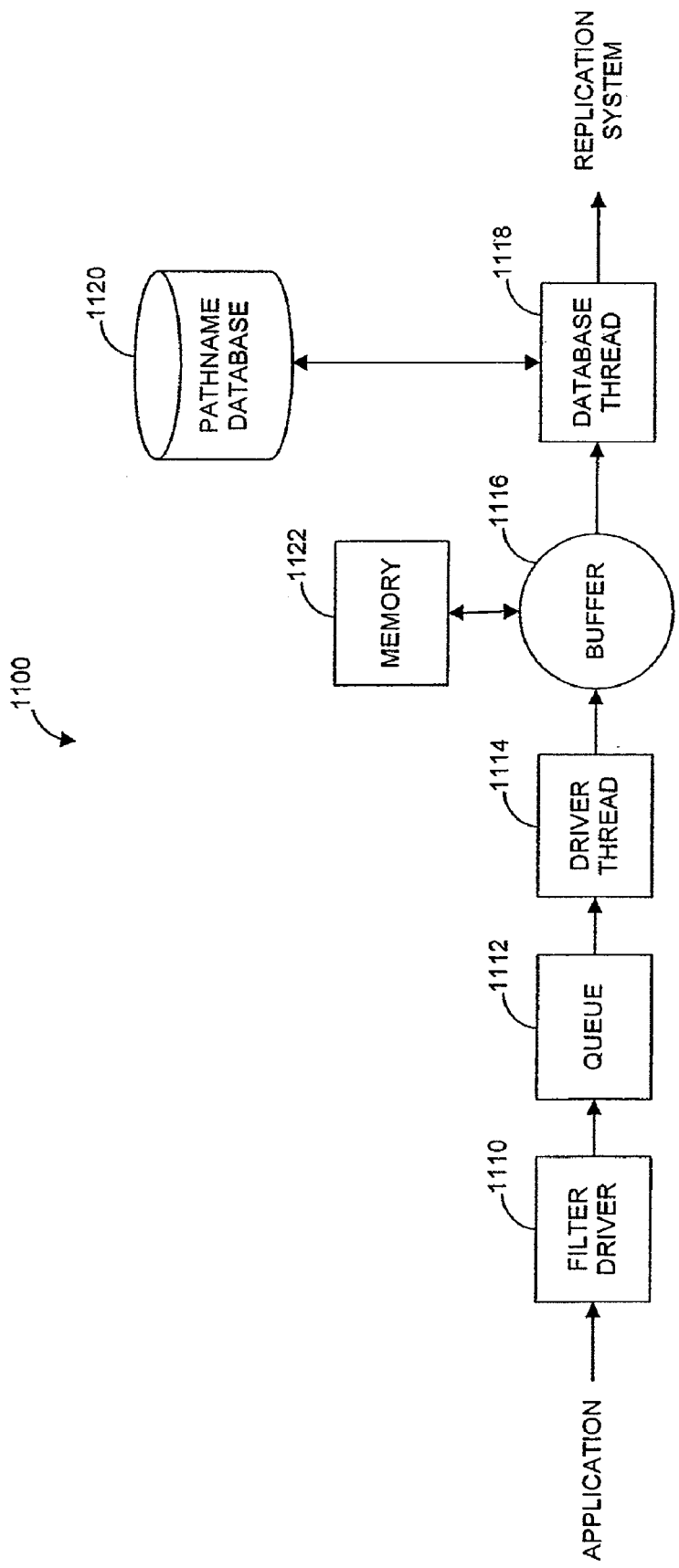
FIG. 11 illustrates a block diagram of an exemplary embodiment of a pathname translation system usable with embodiments of a replication system.

FIG. 11 illustrates a block diagram of an exemplary embodiment of a pathname translation system 1100 that is configured to more efficiently perform pathname translation in a data replication system. For example, in certain embodiments, the translation system 1100 is advantageously configured to convert inode numbers (such as those used inside the kernel driver and/or associated virtual file system handlers) of a source system into absolute file pathnames to be used on one or more replication systems. In certain embodiments, all or a portion of the pathname translation is advantageously implemented in the application space external to the kernel space (e.g., in "userland"), thereby reducing potential loads on the source system.

As shown, the pathname translation system 1100 comprises a filter driver 1110. In certain embodiments, the filter driver 1110 is configured to monitor data management operations, such as data write operations or file attribute modification operations, associated with a computer application executing on a source computer. For instance, such operations may comprise changes to data in a production level memory. Examples of embodiments of filter drivers usable with the pathname translation system 1100 are described in more detail herein.

The filter driver 1110 is further configured to populate a queue 1112 with log entries, or "raw" journal entries, related to detected data modification operations from the application. In certain embodiments, the log entries generated by the filter driver 1110 are each associated with an inode that identifies to which directory and/or file on the source storage device the associated data modification was directed. The queue 1112 is configured to store the log entries until they are processed by a driver thread (or process) 1114. In certain embodiments, the queue 1112 is implemented in volatile memory on the source system.

The queue 1112 forwards the log entries to the driver thread 1114. In certain embodiments, the driver thread 1114 polls the queue 1112 for newly-generated log entries by the filter 1110. The driver thread 1114 subsequently stores the log entries in a buffer 1116. In certain embodiments, the buffer 1116 may be labeled a "raw" buffer in that it is configured to store "raw" log entries, which were generated by the filter driver 1110 and/or which do not yet have an absolute file pathname.

In certain embodiments, the buffer 1116 is a memory-based queue for storing the log entries until processed by a database thread (or process) 1118. In certain embodiments, the buffer 1116 advantageously facilitates and/or expedites the unloading of raw records from expensive driver memory to swappable application memory. For instance, the buffer 1116 may comprise an application level-buffer of a size between approximately 40 megabytes and approximately 60 megabytes. In certain embodiments, the buffer 1116 is advantageously implemented as a first-in first-out buffer.

In certain embodiments, the database thread 1118 is advantageously capable of performing inode-to-pathname translation for each of the log entries in the buffer 1116. After performing the translation, the database thread 1118 may send the log entry (with the absolute file pathname instead of the inode entry) to a desired destination, such as a replication system, for further processing. In yet other embodiments, the database thread 1118 sends the log entry to a cache, such as the rolling cache 1002 of FIG. 10, on the source system prior to the log entry being sent to a replication system.

In certain embodiments, the database thread 1118 is configured to access a pathname database 1120 to enable the thread 1118 to perform pathname translation. The pathname database 1120 advantageously stores information that associates one or more inodes or short names with an absolute file pathname. In yet other embodiments, the pathname database 1120 may comprise other means or data for performing pathname translation, including, but not limited to, a flat table, customized code, combinations of the same or the like.

In certain embodiments, the database thread 1118 is configured to sequentially process and perform pathname translation for each of the log entries and/or perform database updates. In certain embodiments, because the entries are processed in the same order as recorded by the source storage system, the consistency of storage file names in preserved in the pathname database 1120 each time a new record arrives. In certain further embodiments, a particular file system is associated with only a single database thread 1118. In certain embodiments, use of a single thread to perform pathname translation also facilitates synchronization between the pathname database 1120 and the source system (e.g., source file system). Because all the database lookups and changes to the pathname database are being performed by or through the database thread 1118 in a serialized manner, unwanted modifications to pathnames prior to accessing the pathname database 1120 are avoided.

In certain embodiments of the invention, accessing the pathname database 1120 introduces delay into the translation system 1100. For example, at certain points in the replication process, the filter driver 1110 may generate log entries at a quicker pace than the pathname translations being performed by the database thread 1118. For instance, high activity disk lookups in the database 1120 for each log entry may require more time than the generation of the log entries by the filter driver 1110.

In such embodiments, the buffer 1116 is advantageously capable of adapting itself to the speed of the database thread 1118. For example, when the lookups by the database thread 1118 are relatively fast, the buffer 1116 does not introduce significant delay into the data flow (e.g., relatively no performance degradation due to the buffer 1116). Thus, the buffer 1116 may be advantageously sized to be relatively transparent to the data stream (e.g., has a small footprint). However, when the database lookups begin to slow down, the buffer 1116 is able to store multiple log entries until the database thread 1118 is able to catch up.

In certain embodiments, the database lookups by the database thread 1118 may become so time intensive that the maximum storage capacity of the buffer 1116 is reached. In such embodiments, the buffer 1116 is configured to provide disk swapping functionality to avoid overflow of the buffer 1116, which may result in memory problems and/or aborting replication. For instance, as shown in FIG. 11, the buffer 1116 may store excess log entries in a folder in memory 1122. In certain embodiments, the memory 1122 may comprise a disk and/or may be located on the storage device of the source machine.

In performing the swapping, the buffer 1116 forwards the most recent log entries to the memory 1122. As the database thread 1118 retrieves and processes the least recent log entries in the buffer 1116, the buffer 1116 retrieves the log entries stored in the memory 1122.

Disk swapping, as discussed above, may also introduce delay or performance degradation into the translation system 1100. Thus, in certain embodiments, the translation system 1100 is configured to monitor the status of the queue 1112 and/or the buffer 1116 to determine whether the accumulation of non-processed log entries exceeds a particular threshold. For instance, such monitoring of the queue 1112 may be performed by the filter driver 1110 and/or other management component external to the translation system 1100. In certain embodiments, the filter driver 1110 utilizes a counter to track the number of log entries stored in the queue 1112.

In certain embodiments, if the accumulation of non-processed log entries becomes too high, the translation system 1100 is configured to throttle the application and/or other applications running on the system. For example, the filter driver 1110 may monitor the memory required by the stored log entries, and when the memory exceeds a given threshold, throttling of the application takes place. For instance, a threshold between approximately 30 megabytes and approximately 60 megabytes may be established such that application throttling occurs when the threshold is exceeded.

In certain embodiments, application throttling includes the filter driver 1110 introducing delays into the input/output path of the application, such as by holding on to data modification operations rather than letting them pass through to the file system. For instance, the filter driver 1110 may cache the data modification operations until the database thread 1118 has processed the excess log entries. In yet other embodiments, the filter driver 1110 may issue a command to suspend the user application (e.g., for a period of a few milliseconds), such as, for example, a particular operation of the application.

In certain embodiments, the driver throttling of the application is independent of the disk swapping processes of the buffer 1116. In yet other embodiments, communication may exist between components of the translation system 1100 such that the driver throttling process is used in conjunction with disk swapping.

Although the translation system 1100 has been described with reference to particular embodiments, other embodiments of the translation system 1100 may take on other configurations and/or functions. For example, in certain embodiments, the translation system 1100 may function without the queue 1112 and/or the driver thread 1114. In such embodiments, the buffer 1116 may be implemented in the filter driver 1110 to advantageously reduce the number of copies made of the log entries. Such a configuration, however, may utilize additional memory of the operating system kernel.

Figure 12:
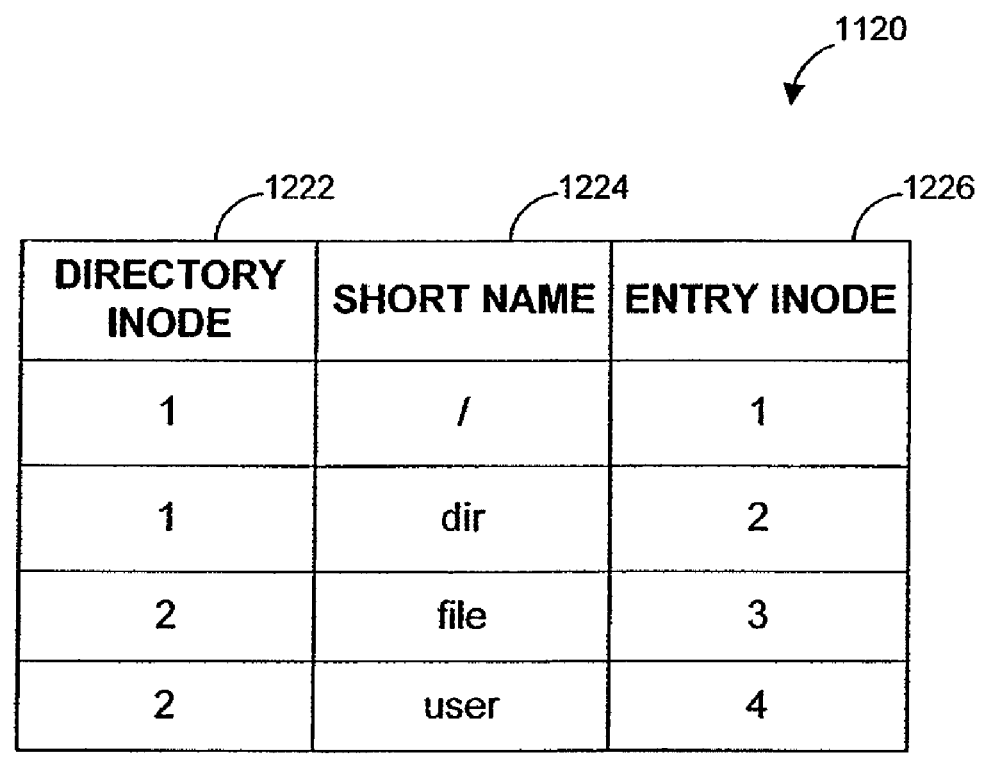

FIG. 12 illustrates an embodiment of a pathname database 1120 of the translation system 1100 of FIG. 11. In particular, the pathname database 1120 may be advantageously accessed by the database thread 1118 when determining an absolute file pathname for one or more log entries.

The illustrated pathname database 1120 is configured for inode-to-pathname translation, such as for a UNIX-based system. In particular, the pathname database 1120 includes three columns: a directory inode (or parent inode) column 1222, a short name column 1224 and an entry inode column 1226.

In certain embodiments, each inode in a UNIX-based system is recorded as an entry in the pathname database 1120. For instance, FIG. 12 illustrates a system having four inodes, each having a single entry in the entry inode column 1226 and having a value of "1" through "4." The corresponding short name column 1224 identifies the short name of the file or folder associated with the particular inode. For instance, entry inode "4" identifies a folder or file with the short name of "user," while entry inode "1" identifies a root directory. The directory inode column 1222, or parent inode column, identifies the inode of the parent directory to the particular entry inode. For instance, entry inode "3," which has a short name of "file," is a child of the folder with an inode of "2."

As can be seen from the illustrated pathname database 1120, when the database thread 1118 receives a log entry with a particular inode, the database thread 1118 is able to access the pathname database 1120 and construct an absolute file pathname using the information stored therein.

Figure 13:
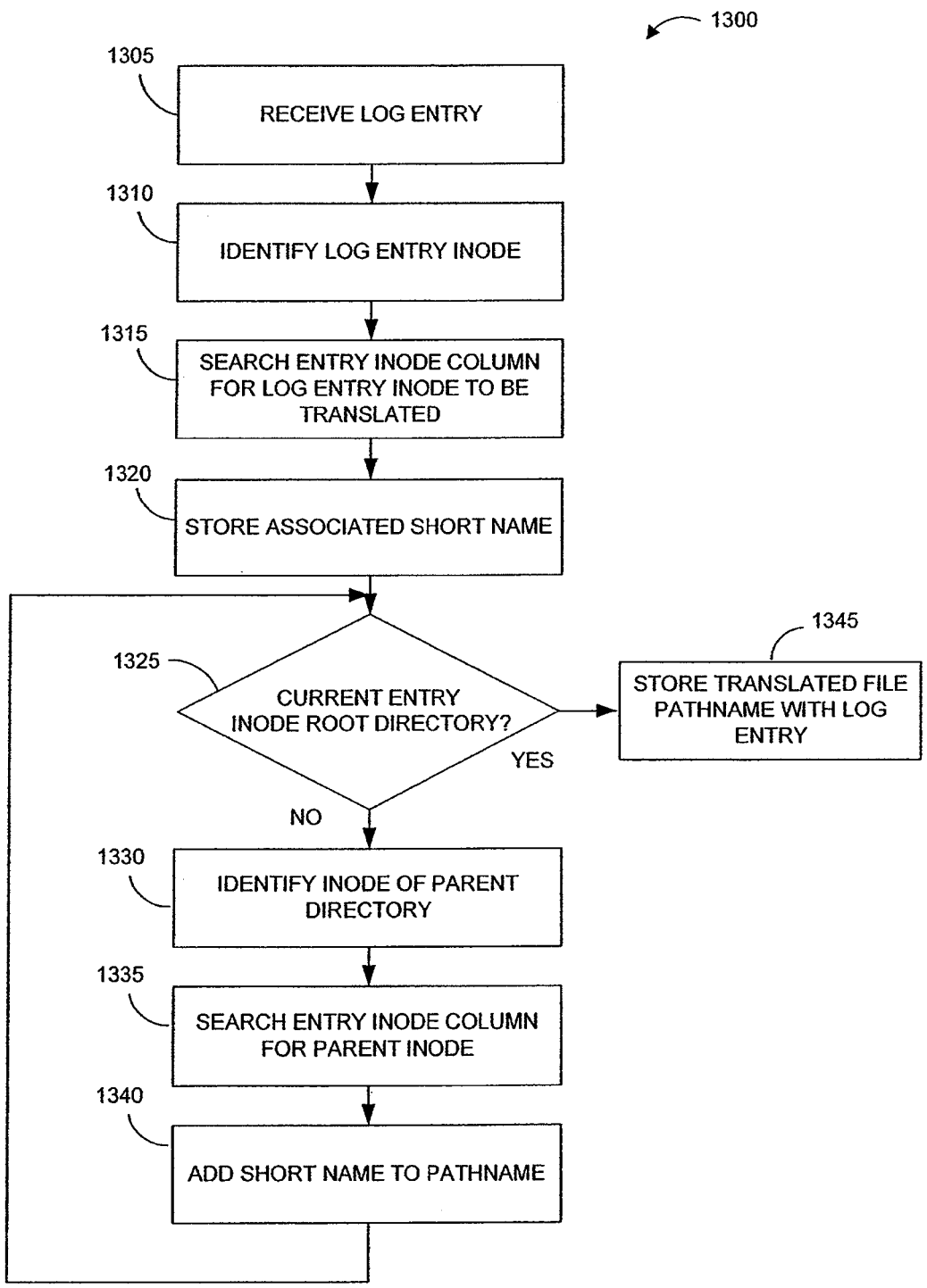
FIG. 13 illustrates a flowchart of an exemplary embodiment of a pathname translation process executable by the pathname translation system of FIG. 12.

FIG. 13 illustrates an embodiment of a simplified pathname translation process 1300, such as may be performed by the database thread 1118 of FIG. 11 in conjunction with the pathname database 1120 of FIG. 12. For example, the pathname translation process 1300 may be used to translate an inode to a pathname, such as an absolute file pathname to be used by a destination system in replicating data.

As shown, the translation process 1300 begins at Block 1305, wherein the database thread 1118 receives a log entry to be processed. For example, with reference to FIG. 11, the database thread 1118 may retrieve the log entry from a buffer 1116. In certain embodiments, the log entry preferably represents a data modification operation associated with a particular application on the source system.

At Block 1310, the database thread 1118 identifies the inode associated with the particular operation represented by the log entry. For instance, the inode may represent a file or folder to which data is to be written. In other embodiments, the inode in the log entry may identify a file name to be modified or other data or file modification operation.

At Block 1315, the database thread 1118 accesses the pathname database 1120 to acquire information for translating the inode to an absolute file pathname. In particular, the database thread 1118 searches the entry inode column 1226 for an entry that corresponds to the value of the log entry inode. Once the corresponding inode entry is found, the database thread 1118 determines (and stores) the associated short name from the short name column 1224 (Block 1320).

The translation process then proceeds with Block 1325. If the subject inode does not correspond to the root directory ("/"), the database thread 1118 identifies from the directory inode 1222 the inode of the parent directory (Block 1330). The database thread 1118 then searches the entry inode column 1226 for the parent directory inode (Block 1335) and adds the short name associated with the parent directory inode to the absolute file pathname (Block 1340).

The translation process 1300 then returns to Block 1325 to repeat the lookups and construction of the absolute file pathname until the database thread 1118 reaches the root directory. Once the database thread 1118 reaches the root directory, the database thread 1118 stores the fully translated file pathname with the associated log entry (Block 1345), and the translation process 1300 terminates.

For exemplary purposes, the translation process 1300 will be now be described with reference to a data write command "vop-write (4, DATA)" and the values illustrated in the pathname database of FIG. 12. To begin the translation process, the database thread 1118 receives the log entry representing the command "vop-write (4, DATA)" (Block 1305) which corresponds to writing "DATA" to inode "4" on the source system (Block 1310).

The database thread 1118 then accesses the pathname database 1120 and searches the entry inode column 1226 for a value of "4" (Block 1315). Upon finding "4" in the entry inode column 1226, the database thread 1118 determines from the short name column 1224 that the short name corresponding to inode "4" is "user" (Block 1320).

Because inode "4" does not correspond to the root directory (Block 1325), the database thread 1118 identifies from the directory inode column 1222 that the parent directory inode of inode "4" is inode "2" (Block 1330). The database thread 1118 then returns to search the inode entry column 1226 for the inode value of "2" (Block 1335), determines that the short name for inode "2" is "dir," and adds "dir" to the file pathname (Block 1340).

Because inode "2" does not correspond to the root directory (Block 1325), the database thread 1118 identifies from the directory inode column 1222 that the parent directory inode of inode "2" is inode "1" (Block 1330). The database thread 1118 then searches the inode entry column 1226 for the inode value of "1" (Block 1335) and determines that the inode "1" corresponds to the root directory ("/") (Block 1340).

Now that the database thread 1118 has encountered the root directory (Block 1325), the database thread 1118 stores the translated file pathname (i.e., "/dir/user") with the subject log entry, and the translation process 1300 terminates.

It will be understood that the translation process 1300 may differ in other embodiments of the invention in order to suit the needs of the particular system(s) involved. For instance, the translation process 1300 may be used to translate particular inodes into file pathnames shorter than an absolute file pathname, such as for example a relative pathname.

In certain embodiments, the three-column database 1120 provides significant advantages over a flat two-column table (e.g., with an inode column and an absolute file pathname column). For instance, the three-column database structure of the pathname database 1120 may use less memory than the two-column table and/or expedite folder rename operations. As an example, when a name of a folder is modified, the three-column database structure allows for a single lookup and modification (e.g., modifying the short name column 1224 entry associated with the entry inode column 1226 entry of the subject inode), while the two-column table would require multiple lookups and modifications corresponding to each entry having an absolute file pathname that includes the folder to be renamed.

As discussed above, in certain embodiments, the pathname database 1120 is maintained in userland (e.g., an application space external to the kernel space). In such embodiments, the pathname database 1120 may be advantageously managed and/or accessed by userland code without impacting the resources of the operating system kernel or other applications.

In certain embodiments, the pathname database 1120 may be initially populated during an initialization period. For instance, a snapshot may be taken to produce a static image of the file system of the source system. The pathname database 1120 may then be populated based on the snapshot. As subsequent changes are made to file names of the source system, corresponding changes are made in the pathname database 1120 in order to maintain synchronization.

In yet other embodiments, the pathname database 1120 may be specific to the files and/or folders of one or more particular applications. For example, the pathname database 1120 may include inodes, short names and related information only for those inodes affected by a single application (e.g., MICROSOFT EXCHANGE). In yet other embodiments, multiple pathname databases 1120 may be used.

Figure 14A:
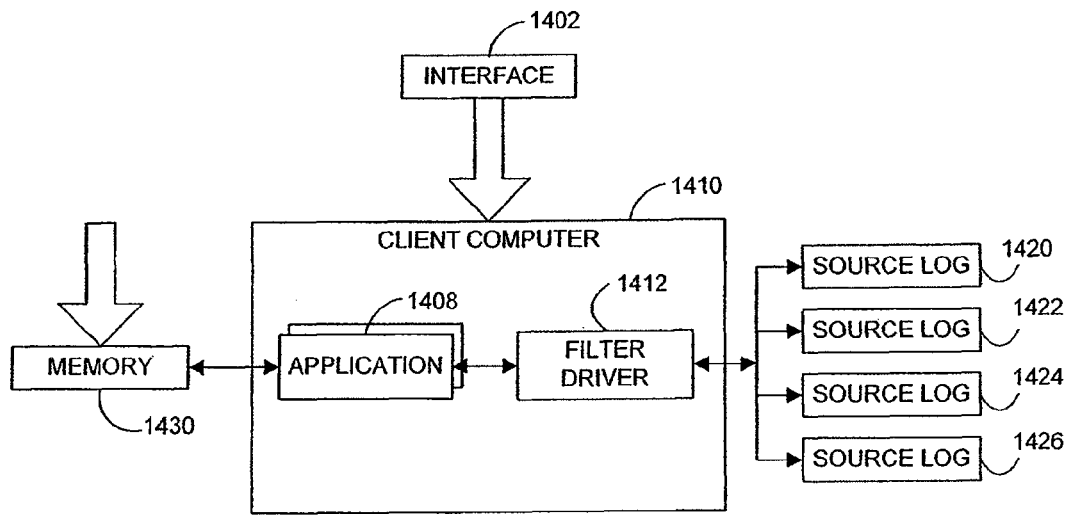
FIGS. 14A and 14B illustrate block diagrams of exemplary embodiments of user interface portions usable with embodiments of a replication system.
Figure 14B:
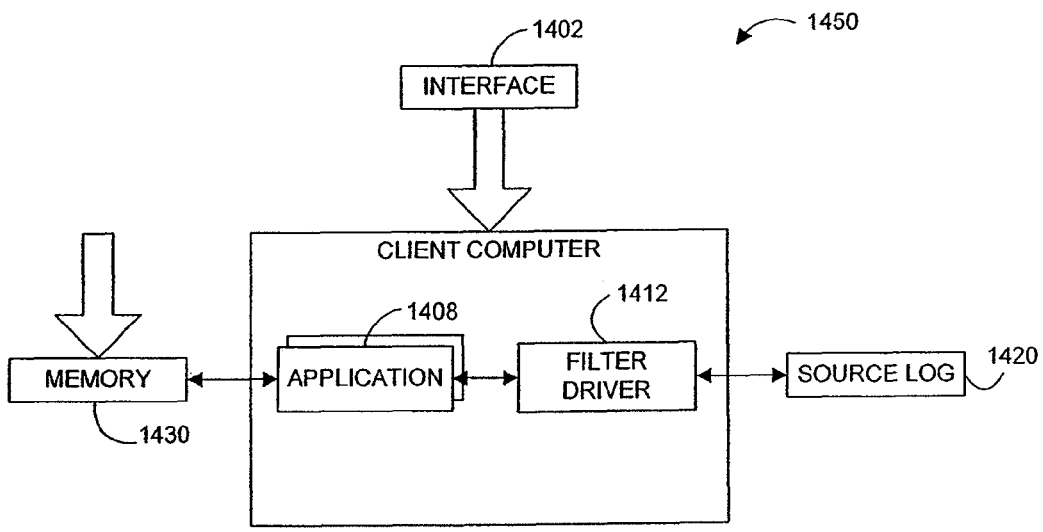

As discussed above, certain embodiments of the invention allow one or more users to customize the replication processes performed by one or more replication systems described herein. FIGS. 14A and 14B illustrate block diagrams of exemplary embodiments of user interface portions of a replication system.

In particular, FIG. 14A illustrates a user interface portion 1400 having an interface 1402 associated with a client computer 1410. In certain embodiments, the interface 1402 comprises a graphical user interface. For instance, the graphical user interface may comprise a one or more windows, drop down lists, text boxes, combinations of the same or the like, displayed on a computer monitor.

The client computer 1410 further includes a filter driver 1412 that communicates with a plurality of source logs 1420, 1422, 1424, 1426. In certain embodiments, each of the source logs 1420, 1422, 1424, 1426 corresponds to a particular application 1408.

In certain embodiments, the interface 1402 provides the user with an option of specifying one or more policies that apply to each of the applications 1408. For instance, the user may be capable of determining which of the applications 1408 is to be monitored and/or how frequently data associated with a particular application is to be copied. In yet other embodiments, the interface 1402 may allow a user to associate particular applications with particular source logs. For example, the user may specify that all data files related to an SQL-related application be filtered and logged in source log 1420. The user may also specify that all data files related to a MICROSOFT EXCHANGE application is to be filtered and logged in source log 1422.

In yet other embodiments, the user, through the interface 1420, may designate different types of data management operations (e.g., storage operations) to be performed on the application data by the filter driver 1412. Storage operations may include, for example, creating snapshot copies, application specific backup data, system related backup data, and/or other copy operations associated with data in a storage operation system.

In other embodiments, filter preferences may be set forth in a template or default storage policy. For example, in the user interface portion 1450 illustrated in FIG. 14B, a single source log 1420 may be used to log files associated with different applications specified by the user. For example, within the source log 1420, the log entries may comprise one or more application identifier fields, such as for example, the application type field 508 (see FIG. 5), for distinguishing between logged entries associated with different user selectable applications.

In certain embodiments, the interface 1402 is included within a source system, such as with the client computer 1410. In yet other embodiments, the interface 1402 may be part of a system management component, such as the storage manager 680 of FIG. 6.

In certain embodiments of the invention, data replication systems and methods may be used in a modular storage management system, embodiments of which are described in more detail in U.S. Pat. No. 7,035,880, issued Apr. 5, 2006, which is hereby incorporated herein by reference in its entirety. For example, the data replication system may be part of a storage operation cell that includes combinations of hardware and software components directed to performing storage operations on electronic data. Exemplary storage operation cells usable with embodiments of the invention include CommCells as embodied in the QNet storage management system and the QiNetix storage management system by CommVault Systems, Inc. (Oceanport, N.J.), and as further described in U.S. patent application Ser. No. 10/877,831, filed Jun. 25, 2004, now published as U.S. Patent Application Publication No. 2005-0033800 A1, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flowchart and/or block diagram block or blocks.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing data replication in a computer network, the method comprising:
   storing log entries in a first-in first-out memory wherein each of the log entries represents a data management operation generated by an application on a source computer for data stored on a first storage device, and wherein each of the log entries has a unique identification associated therewith;
   deleting in the first-in first-out memory, one or more least recently received log entries based on a storage threshold;
   transmitting copies of log entries in the first-in first-out memory, to at least one destination computer;
   replaying the copies of the log entries received by the at least one destination computer to replicate the data management operations on data on a second storage device to create replicated data that replicates the data stored on the first storage device; and
   using the unique identification of the most recently processed log entry on the destination computer to locate a log entry in the first-in first-out memory that occurs after the most recently processed log entry; and
   performing a mirror operation to synchronize the data stored on the source computer with the data stored on the destination computer when the first-in first out memory no longer has a copy of the log entry that occurs after the most recently processed log entry.

2. The method of claim 1, wherein said transmitting is performed without waiting for an acknowledgement from the at least one destination computer.

3. The method of claim 1, additionally comprising detecting a network failure.

4. The method of claim 3, additionally comprising, following the network failure, querying the at least one destination computer for the unique identification of the most recently processed log entry.

5. The method of claim 4, additionally comprising:
receiving from the at least one destination computer the unique identification of the most recently replayed log entry;
locating a copy of the most recently replayed log entry in the first-in first-out memory; and
forwarding copies of log entries following the most recently replayed log entry to the at least one destination computer.

6. The method of claim 1, wherein said deleting comprises deleting from the first-in first-out memory one or more of the oldest log entries when receiving new log entries.

7. A system for facilitating data synchronization following a network failure in a data replication environment, the system comprising:
a plurality of log entries representing data management operations generated by an application on a source computer for data stored on a first storage device, each of the plurality of log entries having a unique identifier associated therewith;
a cache memory that stores the log entries, wherein one or more least recently received log entries are deleted from the cache memory based on a storage threshold;
at least one destination computer that receives the log entries stored in the cache memory, wherein the destination computer processes the plurality of log entries to replicate data to a second storage device; and
at least one replication routine configured to sequentially retrieve each of the plurality of log entries from the cache memory based on a most recently processed log entry by the destination computer and wherein the replication routine performs a mirror operation to synchronize the data stored on the source computer with the data stored on the destination computer when the cache memory no longer has a copy of the log entry that occurs after the most recently processed log entry.

8. The system of claim 7, wherein the unique identifier comprises a sequence number.

9. The system of claim 7, wherein the cache memory comprises a permanent disk cache.

10. The system of claim 7, wherein the at least one replication routine comprises a plurality of replication threads.

11. The system of claim 10, wherein each of the plurality of replication threads communicates with one of the plurality of destination computers.

12. The system of claim 7, wherein the at least one replication routine does not store a copy of transmitted log entries.

13. The system of claim 7, wherein, following a network failure, the at least one replication routine is configured to:
receive from the at least one destination computer the unique identifier of the most recently processed log entry;
locate a copy of the most recently processed log entry in the cache memory; and
forward copies of log entries following the most recently processed log entry to the at least one destination computer.

14. A system for facilitating data synchronization following a network failure in a data replication environment, the system comprising:
means for representing data management operations generated by an application on a source computer for data stored on a first storage device, each of said means for representing including a log entry with a unique identifier;
means for storing a portion of said means for representing such that when a size of the portion of said means for representing reaches a storage threshold of said means for storing, said means for storing deletes one or more of the oldest said means for representing until the size is less than the storage threshold;
means for processing said log entries to replicate data to a second storage device, wherein the means for processing the log entries comprises computer hardware with one or more processors configured to create replicated data that replicates the data stored on the first storage device; and
means for using the unique identifier of a most recently processed log entry on the second storage device, to locate a log entry in the means for storing that occurs after the most recently processed log entry; and
means for performing a mirror operation to synchronize the data stored on the first computer with the data stored on the second computer when the means for storing no longer has a copy of the log entry that occurs after the most recently processed log entry.

15. The system of claim 14, wherein said means for processing comprises a plurality of routines.

16. The system of claim 15, wherein said second storage device comprises a plurality of volumes.

17. The system of claim 16, wherein each of the plurality of routines communicates with one of the plurality of volumes.

* * * * *